United States Patent [19]

Collins

[11] Patent Number: 5,821,186
[45] Date of Patent: Oct. 13, 1998

[54] METHOD FOR PREPARING HYDROUS TITANIUM OXIDE SPHERULES AND OTHER GEL FORMS THEREOF

[75] Inventor: Jack L. Collins, Knoxville, Tenn.

[73] Assignee: Lockheed Martin Energy Research Corporation, Oak Ridge, Tenn.

[21] Appl. No.: 742,461

[22] Filed: Nov. 1, 1996

[51] Int. Cl.$^6$ .............................. B01J 13/00; B01J 35/08; C01B 25/26; C01G 23/053
[52] U.S. Cl. .............................. 502/8; 204/456; 204/470; 252/184; 252/315.01; 264/555; 423/308; 423/598; 423/612; 501/12; 501/137; 502/10; 502/350; 588/13; 588/901
[58] Field of Search .............................. 252/184, 315.01; 501/12, 137; 204/456; 423/308, 598, 612; 264/555; 502/8, 350, 10

[56] References Cited

U.S. PATENT DOCUMENTS

| | | | |
|---|---|---|---|
| 3,522,187 | 7/1970 | Kraus | 252/184 X |
| 4,113,660 | 9/1978 | Abe et al. | 502/350 X |
| 4,161,513 | 7/1979 | Forberg et al. | 423/598 |
| 4,313,844 | 2/1982 | Sato et al. | 252/193 |
| 4,397,778 | 8/1983 | Lloyd | 252/627 |
| 4,502,987 | 3/1985 | Lloyd et al. | 252/635 |
| 4,511,455 | 4/1985 | Dosch et al. | 423/598 X |
| 4,748,016 | 5/1988 | Browaeys et al. | 423/598 |
| 5,122,360 | 6/1992 | Harris et al. | 423/592 |
| 5,207,973 | 5/1993 | Harris et al. | 266/170 |

OTHER PUBLICATIONS

J. L. Collins, M. H. Lloyd and R. L. Fellows, "The Basic Chemistry Involved in the Internal–Gelation Method of Precipitating Uranium as Determined by pH Measurements," *RadioActa*, 121–123 (1987).

J. L. Collins, B. Z. Egan, et al, Evaluation of Selected Ion Exchangers for the Removal of Cesium from MVST W–25 Supernate, ORNL/TM–12938, Apr. 1995.

J. L. Collins, et al, Development and Testing of Ion Exchangers for Treatment of Liquid Wastes at Oak Ridge National Laboratory, ORNLTM–12315, Mar. 1993.

M. H. Lloyd, et al, A Gel Sphere Process for FBR Fuel Fabrication from CoProcessed Feed, ORNL/TM–8399, Feb. 1983.

J. L. Collins, et al, "Batch Test Equilibration Studies Examining the Removal of Cs, Sr, and Tc from Supernatants from ORNL Underground Storage Tanks by Selected Ion Exchangers," submitted for publication in *Proceedings Of the 2nd International Conference of Waste Management: Challenges & Innovations in the Management of Hazardous Waste*, May 10–12, 1995.

O. J. Heinonen, et al, "Sorption of Strontium (II) and Radio Strontium Ions on Sodium Titanate," *Radiochemica Acta*, 28(1981), pp. 93–96.

*Primary Examiner*—Richard D. Lovering
*Attorney, Agent, or Firm*—Shelley L. Stafford

[57] ABSTRACT

The present invention are methods for preparing hydrous titanium oxide spherules, hydrous titanium oxide gels such as gel slabs, films, capillary and electrophoresis gels, titanium monohydrogen phosphate spherules, hydrous titanium oxide spherules having suspendible particles homogeneously embedded within to form a composite sorbent, titanium monohydrogen phosphate spherules having suspendible particles of at least one different sorbent homogeneously embedded within to form a composite sorbent having a desired crystallinity, titanium oxide spherules in the form of anatase, brookite or rutile, titanium oxide spherules having suspendible particles homogeneously embedded within to form a composite, hydrous titanium oxide fiber materials, titanium oxide fiber materials, hydrous titanium oxide fiber materials having suspendible particles homogeneously embedded within to form a composite, titanium oxide fiber materials having suspendible particles homogeneously embedded within to form a composite and spherules of barium titanate. These variations of hydrous titanium oxide spherules and gel forms prepared by the gel-sphere, internal gelation process offer more useful forms of inorganic ion exchangers, catalysts, getters and ceramics.

143 Claims, 5 Drawing Sheets

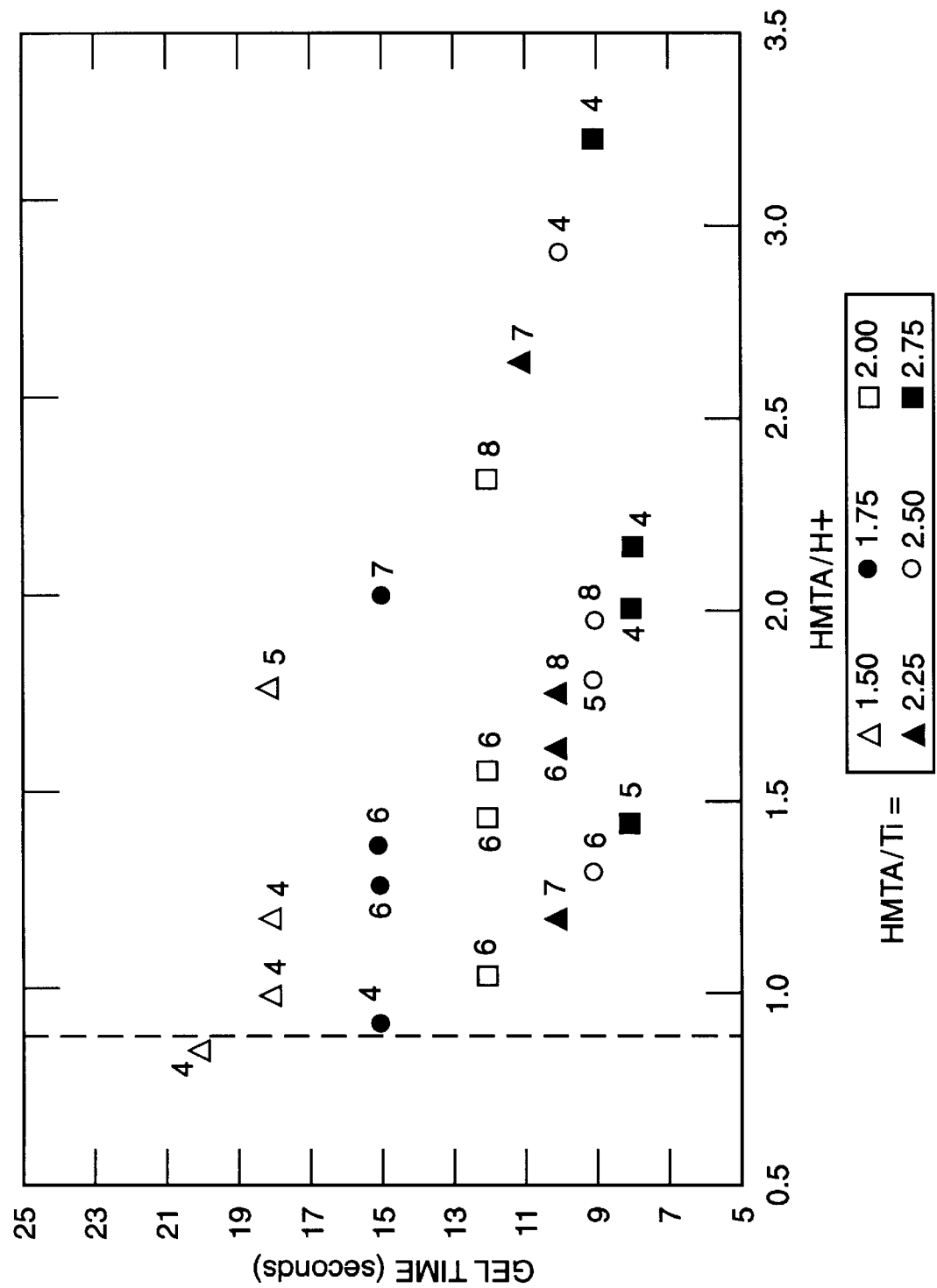

ized ion exchangers, catalysts, getters and ceramics
METHOD FOR PREPARING HYDROUS TITANIUM OXIDE SPHERULES AND OTHER GEL FORMS THEREOF This invention was made with Government support under contract DE-AC05-96OR22464 awarded by the U.S. Department of Energy to Lockheed Martin Energy Research Corporation, and the Government has certain rights in this invention.

FIELD OF THE INVENTION

The present invention relates to a method for preparing inorganic ion exchangers, catalysts, getters and ceramics into more useful forms rather than as powders or granular forms, particularly a method for preparing gels, including electrophoresis gels and spherules of hydrous titanium oxide and variations thereof prepared by the gel-sphere, internal gelation process through the implementation of process control parameters that control the shape, size, and microstructure of the material.

BACKGROUND OF THE INVENTION

Hydrated oxides of many metals (such as titanium, zirconium, hafnium, tin, aluminum, lead, cerium, tungsten, magnesium, manganese, etc.), acidic salts of polyvalent metals (phosphates, tungstates, antimonates, molybdates, tellurates, selenates, silicates, vanadates and hexacyanoferrates of elements such as ammonium, titanium, zirconium, hafnium, tin, lead, etc.), and heteropoly acid salts (ammonium molybdophosphate, ammonium phosphotungstate, ammonium molybdosilicate, ammonium tungstoarsenate, titanium phosphosilicate, etc.) are very effective inorganic ion exchange materials. Because inorganic ion exchangers are stable in high radiation fields, they are especially important in the removal of radionuclides from waste streams. They have high selectivities and efficiencies for separating and removing fission products (e.g., cesium, europium, cerium, ruthenium, zirconium, and strontium), actinides, and other elements (such as silver, lead, mercury, nickel, zinc, chromium, and fluoride) from aqueous waste streams. Most of these materials are also compatible with the matrices used for long term waste storage such as in glass or grout. Certain metal oxides, such as iron oxide and titanium oxide, are known to be effective for use in the photocatalytic decomposition of various hazardous organics and for many other catalytic purposes. Also, many metal oxides are known to be very effective as "getters" in removing volatile fission products from off-gas streams over a broad range of temperature. Getters are trapping materials. For example, quartz wool ($SiO_2$) is used to remove volatile radioactive cesium from the off-gas stream of gas cooled nuclear reactors in Great Britain. Other oxides such as those of titanium, zirconium, aluminum, thorium, uranium, etc. could also be used as getters to remove the volatile cesium from the off-gas streams of high temperature waste treatment processes such as vitrification, molten metal, incineration, etc. that are being used to treat or stabilize radioactive waste streams.

Inorganic exchangers, sorbents, such as hydrous titanium oxide are available as pure material and available commercially only in powder or granular form. Exchangers are also made in which fine particles of hydrous titanium oxide are embedded in organic resins or inorganic materials such as asbestos or zeolites. These sorbents, commercially available only as fine powders or as unstable granular particles, are not readily adaptable to continuous processing such as column chromatography. They have poor hydrodynamic properties. Some of these powders are also made as pellets by using binding materials; however, the binders tend to lessen the number of exchange sites that are available for use. The binders also tend to block pores and passageways to the exchange sites within the structures and adversely affect the loading and kinetic behavior of the exchangers.

Another disadvantage of many of the inorganic ion exchangers that are made as powders, granular material, or as pellets is lack of sorbent reproducibility. These materials are prepared in batch processes in which chemical and physical gradients can occur that cause variances in the crystal morphology and compositions of the products. The granular forms are not very stable and tends to powder or erode, causing problems in column operations. Resins that contain hydrous titanium oxide particles have less capacity for loading and are not stable when exposed to high radiation. Pelletized hydrous titanium oxide that is held together by binding material can be used in columns; however, the loading capacity of this material is lower. Organic binders, when used to make the pellets, are not stable, they tend to decompose, when exposed to high doses of radiation.

There are a number of gel forming processes used in the preparation of inorganic sorbents, catalysts, ceramics, and getters. Common to all these processes is that the constituents of the processes have to be suitable for the bonding of colloidal particles into gel structures. The gels usually are hydrous metal oxides. These processes are generally identified as "sol-gel" processes and the chemistries are complex and path dependent. Typically, they are defined as external or internal gelation processes. In the external gelation processes, gelation reactions involve mass transfer to a second phase or fluid. By comparison, there is little or no mass transfer in the internal gelation processes. One of the original external gel processes for the preparation of nuclear fuels, was developed at Oak Ridge National Laboratory (ORNL). It was based on the gelation of colloidal sol droplets by extracting the water from them in an immiscible alcohol. In other external gelation processes that were developed at various European laboratories, droplets of solutions of organic polymers or sols were chemically gelled with ammonia, usually by mass transfer of the ammonia from a surrounding gas or solution. Making silica-alumina gel as spheres was one of the more interesting internal gelation processes. Gel spheres were made by continuously mixing an acid solution of $AlCl_3$ or $Al_2(SO_4)_3$ with sodium silicate as drops into an immiscible organic medium. The aqueous droplets gelled while in the organic medium. The key to this process was the slow or delayed gelation of silica when the sodium silicate was acidified. The most widely studied internal gelation processes in recent years involves the water hydrolysis of metal alkoxides. In these processes, solution temperature and pH are key parameters used in controlling hydrolysis and polymerization. Materials made by the metal alkoxide processes typically are fine powders.

The internal gelation method employed in the present invention also provides a unique means of making hydrous metal oxide gel-spheres; however, the method is very different from the one described in the previous paragraph which was used to make silicaalumina gel-spheres. The internal gelation method in the present invention is similar to the method or process that was used in the development or light water and breeder reactor spheroidal fuels at ORNL and other worldwide laboratories. The various apparatuses that have been designed to make the fuel spherules can also be used to make the hydrous titanium oxide spherules which are an embodiment of the present invention. Furthermore, the same organic base (hexamethylenetetramine) (HMTA) and complexing agent (urea) is also employed in the present invention as in the previous fuel technology; however, this is where the similarity ends. The key to making fuel spherules or hydrous titanium oxide or any other metal oxide spherules lies in the essential broth formulations and the gel-forming operating parameters. The broth formulations and gel-forming, operating parameters for making spherules of hydrous titanium oxide, hydrous uranium oxide, and hydrous oxide mixtures of uranium and plutonium, and uranium and thorium are all uniquely different.

The original concept for these internal gelation processes which make use of HMTA, urea, and metal salt solutions, was the Keuring van Electrotechnische Materialen at Arnhem (KEMA) process which was developed by M. E. A. Hermans et al. in the Netherlands. It pertained to the production of uranium oxide spherules. One of the fuel processes that made use of the original idea of the KEMA process is described in U.S. Pat. No. 4,397,778 by M. H. Lloyd. It emphasized the essential broth formulations and process parameters for making mixed oxide spherules of uranium and plutonium. In another patent (U.S. Pat. No. 4,502,987 by M. H. Lloyd, J. L. Collins, and S. E. Shell) which was relevant to U.S. Pat. No. 4,397,778, it was found more advantageous to heat-treat the HMTA-urea solutions by boiling for a sufficient duration and then cool the resultant solution to about ambient temperature before admixture with a solution of metals selected from the group consisting of uranium, plutonium, thorium, and mixtures thereof for subsequent spherule formation by passage through a formation nozzle. Heat-treated HMTA solutions of this invention expanded the use of U.S. Pat. No. 4,397,778 because they allowed for the preparation of ceramic spherules over a wider range of spherule densities in a controlled manner.

OBJECTS OF THE INVENTION

Accordingly, it is an object of the invention to provide new methods for preparing inorganic ion exchangers, (sorbents), into a more useful form.

It is another object of the invention to provide new methods for preparing more useful forms of catalysts.

It is a further object of the invention to provide new methods for preparing more useful forms of getters.

It is yet another object of the invention to provide new methods for preparing more useful forms of ceramics.

It is still yet another object of the invention to provide new methods for preparing gels for use in capillary, film or gel slab electrophoresis.

It is another object of the invention to provide new methods for creating larger pore voids and enhanced surface area within the matrices of hydrous titanium oxide spherules.

It is a further object of the invention to provide new methods for converting hydrous titanium oxide spherules to other chemical forms, such as phosphates, tungstate, molybdate, vanadate, selenate, etc.

It is yet another object of the invention to provide new methods for making ultra fine hydrous titanium oxide spherules using an electric dispersion reactor.

It is a further object of the invention to provide spherules of hydrous titanium oxide and variations thereof that are used as inorganic ion exchangers.

It is still yet another object of the invention to provide spherules of hydrous titanium oxide and variations thereof that are used as catalysts.

It is also an object of the invention to provide spherules of hydrous titanium oxide and variations thereof that are used as getters.

It is an advantage of the invention to provide new inorganic ion exchangers as spherules that exhibit good chemical stability in acidic and basic solutions.

It is a further advantage of the invention to provide new inorganic ion exchangers as spherules that are highly selective for certain cations and anions.

It is yet another advantage of the invention to provide new inorganic ion exchangers as spherules that are compatible with final waste forms.

It is also an advantage of the invention to provide new inorganic ion exchangers as spherules that improve the flow dynamics for column operations.

Further and other objects and advantages of the present invention will become apparent from the description contained herein.

SUMMARY

In accordance with one aspect of the present invention, the foregoing and other objects are achieved by a method for preparing hydrous titanium oxide gels comprising the steps of a) providing a homogeneous aqueous broth comprising hexamethylenetetramine, urea, a source of titanium and a known amount of a hydrogen ion source at a temperature from about 0° C. to about 10° C., wherein the broth has a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of the titanium in the broth in the range of about 0.4 to about 1.0; b) placing the aqueous broth within a gel-forming operation, the gel-forming operation is at a temperature from about ambient to about 100° C.; c) maintaining the temperature of the gel-forming operation from about ambient to about 100° C. to form a gel using an internal gelation process; and d) recovering the gel from the gel-forming operation.

In accordance with another aspect of the invention, another object is achieved by a method for preparing hydrous titanium oxide spherules comprising the steps of a) providing a homogeneous aqueous broth comprising hexamethylenetetramine, urea, a source of titanium and a known amount of a hydrogen ion source at a temperature from about 0° C. to about 10° C., wherein the broth has a mole ratio of hexamcthylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of the titanium in the broth in the range of about 0.4 to about 1.0, wherein the broth is stable for a period of time sufficient enough to prevent gelation prior to step b; b) contacting the aqueous broth with an immiscible spherule-forming medium wherein the immiscible spherule-forming medium is at a temperature from about 45° C. to about 100° C.; c) maintaining the temperature of the immiscible spherule-forming medium from about 45° C. to about 100° C. to form sol-gel spherules using an internal gelation process; and d) recovering the spherules from the spherule-forming medium.

In accordance with yet another aspect of the present invention, other objects are achieved by a method for converting hydrous titanium oxide spherules to spherules of titanium monohydrogen phosphate having a desired crystallinity, comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.5 to about 2.75, a mole ratio of hexamethylenetetramine/hydrogen ion ($H^+$) from about 0.90 to about 3.5, a mole ratio of urea/titanium $\geq 1$, and a molarity of the titanium in the broth in the range of about 0.4 to about 1.0, wherein the broth is stable for a period of time sufficient enough to prevent gelation prior to step b; b) contacting the aqueous broth with an immiscible spherule-forming medium, the spherule-forming medium is at a temperature from about 45° C. to about 100° C.; c) maintaining the temperature of the immiscible spherule-forming medium from about 45° C. to about 100° C. to form sol-gel spherules using an internal gelation process; d) recovering the spherules from the immiscible spherule-forming medium; e) rinsing the spherules with an amount of phosphoric acid of $\leq 0.5M$ sufficient enough and for a period of time sufficient enough that allows the spherules to be converted to acid insoluble titanium monohydrogen phosphate; f) allowing the spherules to be mixed with concentrations of phosphoric acid $\geq 0.5M$; g) placing the spherules in a sealed pressure vessel and covering the spherules with a concentration of phosphoric acid sufficient enough as to complete the conversion of the spherules to the acid insoluble titanium monohydrogen phosphate and to prevent the hydrous titanium oxide from dissolving before the conversion; h) heating the spherules in the phosphoric acid to a predetermined temperature up to 100° C., the temperature being increased from ambient temperature up to 100° C. over a period of time sufficient enough as to produce the desired crystallinity; i) rapidly cooling the spherules; j) rinsing the spherules to remove unreacted phosphoric acid; and k) air drying the spherules to a constant temperature.

In accordance with still yet another aspect of the invention, other objects are achieved by a method for preparing hydrous titanium oxide spherules having suspendible particles homogeneously embedded within, forming a composite sorbent, comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of the titanium in the range from about 0.4 to about 1.0; b) adding a predetermined amount of the suspendible particles to the broth, the predetermined amount being of a desired weight percent of the total weight of the composite sorbent, the predetermined amount being an amount sufficient enough to optimize the effectiveness of the composite sorbent; c) continuously mixing the suspendible particles and the aqueous broth while maintaining suspension of the suspendible particles, the broth being stable for a period of time sufficient enough to prevent gelation prior to step d; d) contacting the broth with an immiscible spherule-forming medium, the spherule-forming medium is at a temperature from about 45° C. to about 100° C.; e) maintaining the temperature of the immiscible spherule-forming medium from about 45° C. to about 100° C. to form sol-gel spherules using an internal gelation process with gelation times sufficient enough to allow the suspendible particles to remain suspended prior to gelation and up to complete gelation; and f) recovering the spherules from the immiscible spherule-forming medium.

In accordance with another aspect of the present invention, other objects are achieved by a method for converting hydrous titanium oxide spherules having suspendible particles of at least one different sorbent homogeneously embedded within, forming a composite sorbent, converting to spherules of titanium monohydrogen phosphate having suspendible particles of at least one different sorbent homogeneously embedded within, forming a composite sorbent having a desired crystallinity comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of the titanium in the range from about 0.4 to about 1.0; b) adding a predetermined amount of the suspendible particles to the broth, the predetermined amount being of a desired weight percent of the total weight of the composite sorbent, the predetermined amount being an amount sufficient enough as to optimize the effectiveness of the composite sorbent; c) continuously mixing the suspendible particles and the broth while maintaining suspension of the suspendible particles, the broth being stable for a period of time sufficient enough to prevent gelation prior to step d; d) contacting the broth with an immiscible spherule-forming medium, the immiscible spherule-forming medium is at a temperature from about 45° C. to about 100° C.; e) maintaining the temperature of the immiscible spherule-forming medium form about 45° C. to about 100° C. to form sol-gel spherules using an internal gelation process with gelation times sufficient enough to allow the suspendible particles to remain suspended prior to gelation up to complete gelation; f) recovering the spherules from the immiscible spherule-forming medium; g) rinsing the spherules with an amount of phosphoric acid of $\leq 0.5M$ sufficient enough and for a period of time sufficient enough that allows the external surface of the spherules to be converted to acid insoluble titanium monohydrogen phosphate and allowing the spherules to be mixed with concentrations of phosphoric acid $\geq 0.5M$; h) placing the spherules in a sealed pressure vessel and covering the spherules with a concentration of phosphoric acid sufficient enough to complete the conversion of the spherules to the acid insoluble titanium monohydrogen phosphate and to prevent the hydrous titanium oxide from dissolving before the conversion; i) heating the spherules in the phosphoric acid to a predetermined temperature up to 100° C., the temperature being increased from ambient temperature up to 100° C. over a period of time sufficient enough to produce the desired crystallinity; j) rapidly cooling the spherules; k) rinsing the spherules to remove unreacted phosphoric acid; and l) air drying the spherules to a constant temperature.

In accordance with yet another aspect of the invention, other objects are achieved by an method for preparing titanium oxide spherules comprising the steps of a) providing a homogeneous aqueous broth comprising hexamethylenetetramine, urea, a source of titanium, a known amount of a hydrogen ion source at a temperature from about 0° C. to about 10° C., wherein the broth has a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of the titanium in the range from about 0.4 to about 1.0, wherein the broth being stable for a period of time sufficient enough to prevent gelation prior to step b; b) contacting the broth with an immiscible spherule-forming medium, the immiscible spherule-forming medium is at a temperature from about 45° C. to about 100° C.; c) maintaining the temperature of the immiscible spherule-forming medium from about 45° C. to about 100° C. to form sol-gel spherules using an internal gelation process; d) recovering the spherules from the immiscible spherule-forming medium; e) rinsing the spherules to remove remaining reaction impurities; f) placing the spherules in a heating unit, the spherules forming a bed of spherules within the heating unit, the heating unit providing means to allow moist heated air or oxygen to uniformly flow through the bed of spherules while heating, the moist heated air or oxygen being at a temperature less than the spherules within the heating unit thereby prevents condensation within the heating unit; g) heating the spherules within the heating unit to a temperature sufficient enough and over a period of time sufficient enough to vaporize the free water within the spheres; h) further heating the spherules to a temperature sufficient enough and for a time period sufficient enough to form an oxide of titanium; and i) cooling the spherules.

In accordance with still yet another aspect of the invention, other objects are achieved by a method for preparing titanium oxide spherules having suspendible particles homogeneously embedded within, forming a composite, comprising the steps of a) providing a homogeneous aqueous broth comprising hexamethylenetetramine, urea, a source of titanium, a known amount of a hydrogen ion source at a temperature from about 0° C. to about 10° C., wherein the broth has a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of titanium in the range from about 0.4 to about 1.0; b) adding a predetermined amount of the suspendible particles to the broth, the predetermined amount being of a desired weight percent of the total weight of the composite, the predetermined amount being an amount sufficient enough to optimize the effectiveness of the composite; c) continuously mixing the suspendible particles and the broth while maintaining suspension of the suspendible particles, the broth being stable for a period of time sufficient enough to prevent gelation prior to step d; d) contacting the broth with an immiscible spherule-forming medium, the immiscible spherule-forming medium is at a temperature from about 45° C. to about 100° C.; e) maintaining the temperature of the immiscible spherule-forming medium from about 45° C. to about 100° C. to form sol-gel spherules using an internal gelation process with gelation times sufficient enough to maintain the suspension of the suspendible particles prior to gelation and up to complete gelation; f) recovering the spherules from the immiscible spherule-forming medium; g) rinsing the spherules to remove remaining reaction impurities; h) placing the spherules in a heating unit, the spherules forming a bed of spherules within the heating unit, the heating unit providing means to allow moist heated air or oxygen to uniformly flow through the bed of spherules while heating, the moist heated air or oxygen being at a temperature less than said the spherules within the heating unit thereby preventing condensation within the heating unit; i) heating the spherules within the heating unit to a temperature sufficient enough and over a period of time sufficient enough to vaporize the free water within the spherules; j) further heating the spherules to a temperature sufficient enough and for a time period sufficient enough to form an oxide of titanium; k) drying the spherules for a period of time sufficient enough to allow for evaporation of remaining moisture; and l) dissolving the particles within the spherules with a sufficient amount of a solution selected from the group consisting of ammonium hydroxide, air and oxygen at a sufficient concentration as to facilitate the dissolution.

In accordance with a further aspect of the invention, other objects are achieved by a method for producing hydrous titanium oxide fiber materials comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of titanium in the broth in the range of about 0.4 to about 1.0, wherein the broth being stable for a period of time sufficient enough to prevent gelation prior to step b; b) contacting the broth with an immiscible spherule-forming medium, wherein the immiscible spherule-forming medium is at a temperature from about 45° C. to about 100° C.; c) maintaining the temperature of the immiscible spherule-forming medium from about 45° C. to about 100° C. to form sol-gel spherules using an internal gelation process, the gels having a rigidity ranging from soft to hard; d) recovering the spherules from the immiscible spherule-forming medium; e) introducing the spherules into a single screw extruder; f) extruding the spherules through a die containing multiple micro orifices, thereby producing extruded gelatinous strands; and g) recovering the gelatinous strands.

In accordance with another aspect of the invention, other objects are achieved by a method for producing titanium oxide fiber materials comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of titanium in the broth in the range of about 0.4 to about 1.0, wherein the broth being stable for a period of time sufficient enough to prevent gelation prior to step b; b) contacting the broth with an immiscible spherule-forming medium, wherein the immiscible spherule-forming medium is at a temperature from about 45° C. to about 100° C.; c) maintaining the temperature of the immiscible spherule-forming medium from about 45° C. to about 100° C. to form sol-gel spherules using an internal gelation process; d) recovering the spherules from the immiscible spherule-forming medium; e) introducing the spherules into a single screw extruder; f) extruding the spherules through a die containing multiple micro orifices, thereby producing extruded gelatinous strands; g) recovering the gelatinous strands; h) placing the recovered gelatinous strands in a heating unit, the strands forming a bed of strands within the heating unit, the heating unit providing means to allow moist heated air or oxygen to uniformly flow through the bed of strands while heating, said moist heated air or oxygen being at a temperature less than the strands within the heating unit thereby preventing condensation within the heating unit; i) heating the strands within the heating unit to a temperature sufficient enough and over a period of time sufficient enough to vaporize the free water within the strands; j) further heating the strands to a temperature sufficient enough and for a time period sufficient enough to form an oxide of titanium; and k) cooling the strands.

In accordance with still another aspect of the invention, other objects are achieved by a method for preparing hydrous titanium oxide fiber materials having suspendible particles homogeneously embedded within, forming a composite, comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of titanium in the range from about 0.4 to about 1.0; b) adding a predetermined amount of the suspendible particles to the broth, the predetermined amount being of a desired weight percent of the total weight of the composite, the predetermined amount being an amount sufficient enough to optimize the effectiveness of the composite; c) continuously mixing the suspendible particles and the broth while maintaining suspension of the suspendible particles, the broth being stable for a period of time sufficient enough to prevent gelation prior to step d; d) contacting the broth with an immiscible spherule-forming medium, the immiscible spherule-forming medium is at a temperature from about 45° C. to about 100° C.; e) maintaining the temperature of the immiscible spherule-forming medium from about 45° C. to about 100° C. to form sol-gel spherules using an internal gelation process with gelation times sufficient enough to allow the suspendible particles to remain suspended prior to gelation and up to complete gelation; f) recovering the spherules from the immiscible spherule-forming medium; g) introducing the spherules into a single screw extruder; h) extruding the spherules through a die containing multiple micro orifices, thereby producing extruded gelatinous strands; and i) recovering the gelatinous strands.

In accordance with still yet another aspect of the invention, other objects are achieved by a method for preparing titanium oxide fiber materials having suspendible particles homogeneously embedded within, forming a composite, comprising the steps of a) providing a homogeneous aqueous broth comprising hexamethylenetetramine, urea, a source of titanium and a known amount of a hydrogen ion source at a temperature from about 0° C. to about 10° C., wherein the broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of titanium in the range from about 0.4 to about 1.0; b) adding a predetermined amount of the suspendible particles to the broth, the predetermined amount being of a desired weight percent of the total weight of the composite, the predetermined amount being an amount sufficient enough to optimize the effectiveness of the composite; c) continuously mixing the suspendible particles and the broth while maintaining suspension of the suspendible particles, the broth being stable for a period of time sufficient enough to prevent gelation prior to step d; d) contacting the broth with an immiscible spherule-forming medium, the immiscible spherule-forming medium is at a temperature from about 45° C. to about 100° C.; e) maintaining the temperature of the immiscible spherule-forming medium from about 45° C. to about 100° C. to form sol -gel spherules using an internal gelation process with gelation times sufficient enough to allow the suspendible particles to remain suspended prior to gelation and up to complete gelation; f) recovering the spherules from the immiscible spherule-forming medium; g) introducing the spherules into a single screw extruder; h) extruding the spherules through a die containing multiple micro orifices, thereby producing extruded gelatinous strands; i) recovering the gelatinous strands; j) placing the recovered gelatinous strands in a heating unit, the strands forming a bed of strands within the heating unit, the heating unit providing means to allow moist heated air or oxygen to uniformly flow through the bed of strands while heating, the moist heated air or oxygen being at a temperature less than the strands within the heating unit thereby preventing condensation within the heating unit; k) heating the strands within the heating unit to a temperature sufficient enough and over a period of time sufficient enough to vaporize the free water within the strands; l) further heating the strands to a temperature sufficient enough and for a time period sufficient enough to form an oxide of titanium; and m) cooling the strands.

BRIEF DESCRIPTION OF THE DRAWINGS

FIG. 5 reflects the data obtained in EXAMPLE 5 for making gel-spherules at gel-forming temperatures of 90° C.±5°.

DETAILED DESCRIPTION OF THE INVENTION

Figures 1, 1A:
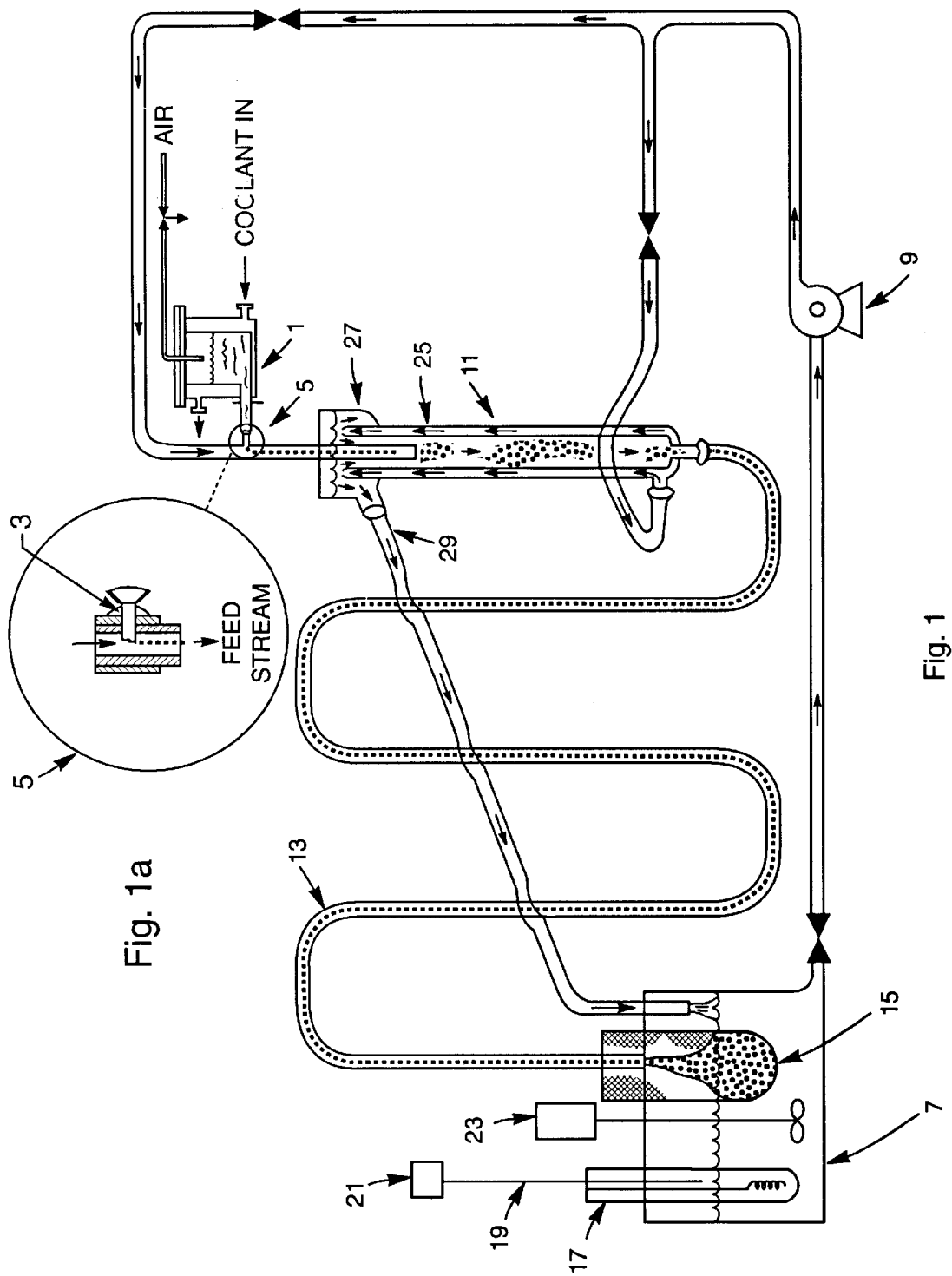
FIG. 1 illustrates the spherule-forming apparatus used in EXAMPLES 1–5.

The method of the present invention is a method using optimum formulations and conditions for making hydrous titanium oxide gels and spherules by the gel-sphere, internal gelation process. These optimum formulations and conditions create an optimum process parameter window for making the hydrous titanium oxide spherules. The present invention is unique in that it provides a method for making ion exchangers into a more usable form rather than as a powder or granular form. Spherules of pure hydrous titanium oxide are made by the method of the subject invention. Spherules of a specific size in a diameter range of 0.1 to 2 mm are reproducibly made using laboratory and engineering scale equipment. Spherules made by the present invention can also be made in which very fine particles of other chemicals, metals, and biochemicals can be homogeneously dispersed throughout the matrix. Variations of spherules of hydrous titanium oxide which contain fine particles of other inorganic ion exchangers include titanium monohydrogen phosphate, sodium titanate, titanium tungstate, titanium molybdate, ammonium molybdophosphate, ammonium phosphotungstate, polyantimonic acid, silicotitanate, silicozirconate, hexacyanoferrates, etc. that are embedded homogeneously throughout the gel matrix providing for dual purpose ion exchangers. For example, hydrous titanium oxide spherules can be made that contain potassium cobalt hexacyanoferrate particles. In a basic stream saline solution, this material can selectively remove both cesium and strontium. The hydrous titanium oxide sorbs the strontium and the potassium cobalt hexacyanoferrate sorbs the cesium. In some cases gelatinous spherules of hydrous titanium oxide can be converted by chemical reactions to spherules of other ion exchangers such as titanium monohydrogen phosphate, sodium titanate, titanium hexacyanoferrate and many more. The hydrous titanium oxide spherules can also be converted to other chemical forms, such as tungstate, molybdate, vanadate, selenate, etc. Furthermore, to create more surface area, spherules can be prepared containing embedded particles of material that can subsequently be dissolved and removed to create larger, interconnecting pores within the spherules.

The key parameters of the method of the subject invention are concentrations of the constituents of the broth; broth stability; reaction temperature; gelation time; completeness of gelation; and types of gels formed.

The concentrations of the constituents of the aqueous broth are critical to being able to make spherules by this internal gelation process. The concentrations help determine broth stability, gelation times, and types of gels. In the method of the present invention, an aqueous broth for making hydrous titanium oxide contains four chemical constituents: a source of titanium such as titanium tetrachloride ($TiCl_4$) or titanium (III) chloride, hydrochloric acid (HCl), urea and HMTA. The initial concentrations in a broth and the order of mixing these chemicals are important. Initially, two separate stock solutions are prepared. One contains HMTA and urea and the other contains titanium tetrachloride and HCl. Alternatively, the urea can be added to the titanium tetrachloride and HCl solution rather than with the HMTA. The urea can be added to either solution as long as the mole ratio of urea/titanium is 1 or greater. The preferred practice of the present invention is to use a mole ratio of urea/Ti that is similar to that of the HMTA/Ti. To prepare a broth, these solutions have to be chilled to near 0° C. before they are mixed.

Urea serves as a complexing agent for the titanium and allows for preparation of stable broths at about 0° C. The present invention defines a stable broth as one that stays clear and free of metal gelation or precipitation for a reasonable period of time before it is acted upon to initiate gelation, typically for at least 1 hour at 0° C.

HMTA is a weak organic base that is used to hydrolyze the titanium and cause gel formation at higher temperatures. At higher temperatures, the urea also serves to catalyze the decomposition of protonated HMTA molecules resulting in the HMTA being a more effective base; however, decomposition only occurs after most of the HMTA molecules have been protonated. The chemical mechanisms involved in this internal gelation process has been described by J. L. Collins et al in *Radiochimica Acta*, 42 (1987) pp. 121–134.

To provide more control over the final concentrations of the constituents in the broth, a saturated stock solution of about 3.2M HMTA is preferably prepared which also has a urea concentration of about 3.2M. The stock solution of HMTA/urea is prepared using pure crystalline HMTA (non-free flowing) rather than the more commonly used free flowing form of HMTA. The free flowing form is a granular HMTA that contains additives that prevent the clumping that is characteristic of the pure crystalline form HMTA. It was discovered that the additives used to make the HMTA free flowing also cause an undesirable reaction to occur between the HMTA and urea that can be detrimental to the internal gelation process making it less reproducible, especially for runs at higher temperatures $\geq 80°$ C. This behavior was visibly seen when samples of about 3.2M HMTA (free flowing type) and about 3.2M urea were heated together at 95° C. for several minutes, the solution developed a pearl-essence that intensified with time. The crystalline form of HMTA is recommended in the process of the present invention; however, the free flowing form of HMTA can also be used in some applications especially at temperatures <80° C. and for some applications at temperatures >80° C., depending upon which additives the manufacturer added to the HMTA to facilitate its free-flowing properties.

A source of titanium such as titanium tetrachloride or titanium (III) chloride is the principal starting materials used in the present invention. Titanium tetrachloride is the preferred, most stable source of titanium used to prepare the hydrous titanium oxide spherules. Pure titanium tetrachloride is a liquid with a formula weight of 189.71 g/mole with a specific gravity of 1.726 g/mL.

When water is added to the titanium tetrachloride, an exothermic reaction occurs with the formation of hydrous titanium oxide gel and hydrochloric acid (HCl). To prepare a stable stock solution of titanium tetrachloride, water acidified with HCl is used to dilute it. When a sufficient amount of HCl is added, the hydrolysis reaction is suppressed and gel formation is prevented. Soluble titanium oxo-chloro anion species $[TiO_2Cl_4]^{4-}$ and $[TiOCl_5]^{3-}$ are known to form in the acidified solutions. As will be described later, the amount of HCl used in a broth is one of the critical process parameters for the subject invention. The amount of HCl used is a controlling parameter for the gelation process for making hydrous titanium oxide spherules or gels in other configurations.

In the broth formulations that are described in the subject invention, the concentrations of hydrogen ion refer only to the hydrogen ions of acid that is added to the broth. Hydrochloric acid is the preferred acid used in the invention, but other acids such as nitric acid or sulfuric acid can also be used. In the present invention, HCl is the preferred source of hydrogen ions that are added to the broth in a known amount.

To make reproducible gel spherules, it is imperative that the ingredients in the broth be thoroughly mixed. The HMTA/urea stock solution and the titanium tetrachloride/HCl stock solution are combined in a chilled mixing devise or by pumping the two different solutions at temperatures of 0° to 5° C. from separate tanks into a mixing device at the necessary rate to make the specific broth desired. The batch volume used or the desired pumping rates for a broth is dependent upon the type of gel spherule desired or needed, whether it be a soft, medium or hard gel. In the present invention, the type gel-spherule desired is selected from a process parameter windows of EXAMPLES 2, 3, 4 and 5 below. These examples provide the necessary broth formulations and gel forming conditions that are needed to make hydrous titanium oxide gel spherules.

Gels prepared by these examples give a range of rigidity from soft to hard. Initially, a range of relative gel rigidities were determined by conducting small scale test tube studies using about 0.5 mL of broth. In each study, a test tube containing 0.5 mL of broth was inserted into a water bath that was maintained at a constant temperature of 60°, 70°, 80°, or 90° C. After being in the bath for 15 minutes, the test tube was removed and cooled to room temperature. To determine the apparent rigidity of a gel, a small metal laboratory spatula was inserted into the gel. A nominal scale of 1 to 10 collins units of rigidity was used to define the rigidity of the gel with 1 collins representing gels with the approximate consistency of water and 10 collins representing gels that were almost too hard to penetrate with the spatula. Most of the gels formed with the broths in the broth formulations window had rigidities between 3 collins and 8 collins. Gels ranked as 3 collins were very soft and pasty whereas gels ranked as 8 collins were difficult to penetrate and stir with the spatula because they had a hard, dry, granular consistency.

In making more accurate dynamometric measurements of the compression strengths of the gel-spherules, the hardest gels (8 collins) were found to be able to withstand a force up to about 60 grams. On the other hand, the softest gel-spherules with rigidity ratings of 3 collins and 4 collins were easily compressed with 5 grams or less force. For the broth formulations defined by Examples 2, 3, 4, and 5, the harder gels (7 collins and 8 collins) can only be made at temperatures >75° C. All the gels that were ranked as 7 collins and 8 collins were also the most opaque of the gels. The gels that were ranked as 3 collins and 4 collins were the least opaque. The clearest gels were also made at temperatures <65° C.

The optimum process parameter window for making spherules of hydrous titanium oxide requires that the broth be stable at 0° C. to 10° C. for a reasonable period of time, sufficient so as to prevent premature hydrolysis and gelation of the titanium prior to being introduced as droplets into the heated organic medium. In large scale preparation of spherules, broth formulations that are stable for $\geq 1$ hour are desirable. The broth formulations declared in the optimum process window of applicant's invention (EXAMPLES 2, 3, 4 and 5) are stable for $\geq 1$ hour. In order for the internal gelation method of making spherules to work properly, the broth droplets have to be introduced in the hot organic medium before gelation is initiated. Chilled broths that gel in less than one hour could be used if the HMTA/urea and the $TiCl_4$/HCl were pumped from separate tanks into a mixing device prior to being ejected as droplets into the hot organic medium. A mixing method of this type would most likely be used in the large scale production of spherules.

Reaction temperature and gelation time are also very important process variables. The organic medium has to be water-immiscible with a density slightly higher than that of the aqueous broth. Large droplets are formed best if there is a density difference of 0.05 to 0.10 $g/cm^3$ between the organic medium and broth. The density difference can be less for small droplets. Other important factors that need to be considered include flammability, toxicity, impurities, cost and disposal of the organic medium.

The organic medium can be one-component solvents and binary mixtures as well. For example, silicone oils, such as Dow Corning Silicon Fluid 200, work well for the complete temperature range from ambient temperatures to 100° C. A mixture of 75% perchloroethylene (PERC) and 25% iso-amyl alcohol (IAA) can be used at temperatures up to 90° C. but does not require an organic wash before the basic washes. TCE can be used at temperatures of $\leq 65°$ C. Kerosine type hydrocarbons and 2-ethyl-1-hexanol have been used as gel forming media.

If the organic spherule-forming medium has a high viscosity or boiling point (e.g., PERC, 2-ethyl-1-hexanol or silicone oil), the residual medium on the gelled spherules has to be removed by washing with a more volatile organic. TCE, carbon tetrachloride or hexane can be used for silicone oil; isopropyl alcohol for PERC; and carbon tetrachloride for 2-ethyl-1-hexanol. Neither TCE nor the 75% PERC nor 25% iso-amyl alcohol require an organic wash after aging.

Introduction of the aqueous broth droplets into a flowing stream of hot, water-immiscible, organic medium causes decomplexation of the titanium molecules that are complexed with urea, allowing hydrolysis and gelation of the titanium to occur. The hydrolysis reaction is driven by protonation of HMTA molecules which effectively removes $H^+$ from the broth. It is also driven, in some cases, by the decomposition of the protonated HMTA molecules to form ammonia molecules. The rate at which these reactions takes place depends upon both temperature and on the concentrations of the constituents in the broth.

For gelation to occur, the pH value of the broth droplets has to be at or above the pH value of precipitation. For hydrous titanium oxide, precipitation begins in the pH range of 1 to 2. To obtain acceptable gelation times for hydrous titanium oxide, the organic medium is heated at some specific temperature in the range of 45° C. to 100° C. A gelation time of $\leq 60$ seconds is recommended. For operating reasons and for practical purposes, gelation times of $\leq 30$ seconds are normally best. The longer the microdroplets of broth remain ungelled in the hot organic medium, the greater the risk of their coalescing and forming larger droplets.

The temperature of the organic medium used also has an effect on the type of gel formed, from soft to hard. The spherules are held in the hot organic medium and allowed to age before being removed. Allowing the gelled spherules to remain in the heated organic medium for a period of 10 to 30 minutes assures completeness of titanium hydrolysis and the reproducibility of the gelation process. The degree of aging can have an effect on the type of gel structure obtained. After being held in the heated organic medium for a period of $\leq 60$ minutes, normally between 15 and 30 minutes, to allow for completeness of the gelation and for aging, the spherules are removed from the organic medium, then washed with ammonium hydroxide ($NH_4OH$), generally $\leq 1M$, to remove the residual impurities, and then are dried. If silicone oil, 2-ethyl-1-hexanol, or PERC is used, the residual medium on the gelled spherules is removed with an organic solvent, such as trichloroethane (TCE), before basic washing with an aqueous medium. The soluble reactants and reaction products, HMTA, urea and ammonium salts, such as ammonium chloride, can be removed from the gelled spherules by washing with 0.1 to 5M ammonium hydroxide and then with deionized water.

The type of drying procedure used depends upon the intended use of the spherules as sorbents, catalysts or getters. A number of drying methods can be used. For an example with specific information, see report ORNL/TM-8399 published February 1983 by M. H. Lloyd et al, entitled *A Gel Sphere Process for FBR Fuel Fabrication from Coprocessed Feed*, hereby incorporated herein by reference. The drying conditions of the wet spherules were found to have a pronounced effect on the densities of the final oxide products. To make ceramic oxides to be used as catalysts and getters, parameters such as heat-up rate, time and temperature, and drying atmosphere have definite effects on crystal growth. For instance, steam can be used in the drying process to produce larger crystals. For use as inorganic ionexchangers, the wet hydrous titanium oxide spherules only need to be air-dried to a constant temperature at ambient temperature. Hydrous titanium oxide ion exchangers that have been made as powders are known to be much less effective as sorbents when the interstitial liquid and water of hydration are removed at temperatures $\geq 200°$ C.

Preparation of inorganic ion exchangers as spherules improves the flow dynamics for column operations and expands their practical applications. The hydrous titanium oxide spherules produced by the present invention can be reproducibly made on a small or large scale. These inorganic ion exchangers are stable in high radiation fields; many exhibit good chemical stability in acidic and basic solutions;

some are highly selective for certain cations and anions; and most are compatible with final waste forms. Inorganic spherules produced by the present invention are useful to remove highly radioactive fission products from hot cell waste solutions. In addition, the inorganic ion exchanger spherules produced by the internal gelation process, have sorption characteristics that are equal or better than those obtained for most commercial powders tested. In many cases, the densities or porosities of the exchangers can be tailored by varying process parameters.

Some ion exchange applications include removing cesium, strontium, and actinides from acid solutions, as well as removing strontium, technetium, and cesium from tank supernatants. The spherules can also be used for treating contaminated wastewater to remove uranium, technetium, cobalt, lead, etc. Another application of the present invention includes removing radioisotopes from groundwater and removing actinides and fission products from sludge leachates. In addition, other applications include removal of heavy metals from acid mine drainage; removal of radionuclides from organic streams; removal of fluoride from waste streams; and cleanup and concentration of liquid wastes in hot cells.

The method of the present invention can also be used as a means for preparing gels for use in capillary, film or gel slab electrophoresis. For example, a chilled aqueous broth made from one of the broth formulations of EXAMPLE 2, 3, 4 or 5 is vacuumed into capillary tubes or some other vessel wherein the gels within the vessels are then heated in the temperature range from about ambient temperatures to about 100° C. to cause gelation, the time of gelation being dependent upon the broth formulation and the temperature. This system defines a gel-forming operation whereby the gels are formed within the desired vessel upon heating in the temperature range from about ambient temperatures to about 100° C. Some gels within the gel-forming operation may simply form at room temperature. The same procedure is used to make hydrous titanium oxide films or gel slabs. These films or gel slabs are formed within a gel-forming operation in which the broth is gelled at a temperature from about ambient temperatures to about 100° C. within the desired vessel. The gel-forming operation to form the gel configuration using the internal gelation process is a system in which the formulated broths of the present invention are drawn into molding cavities and heated to temperatures in the range from about ambient temperatures to about 100° C. to form gels. The surfaces of the molding cavities can be pretreated for easier removal of the gels. Once removed from the molds, the gels are easily washed to remove the reaction impurities (HMTA, urea and ammonium chloride). A gel-forming operation is described in EXAMPLE 13.

Spherules of hydrous titanium oxide can also be heated to make titanium oxide spherules of anatase, brookite or rutile. Anatase is the stable form up to 860° C. Brookite is the predominant form of titanium oxide between 860° and 1040° C., and rutile forms at temperatures greater than or equal to 1040° C. Pure anatase spherules can be used as photocatalysts for converting hazardous organics to safer organic forms. Titanium oxide in the rutile form has a very high dielectric property. A polarized bed of spherules of rutile can be used to capture charged and/or polarized particles from liquid streams. The present invention is the key to making these pure materials as spherules which provides the means for good flow dynamics and maximum surface area utility. To create more surface area for instance, gel-spherules are prepared with embedded particle of materials that are subsequently dissolved and removed from the gel-spherules or the air-dried spherules to create interconnecting pores within the spherules.

Certain gel-precursor broth formulations of the present invention are used to provide more control in making ultra fine hydrous titanium oxide particles or spherules with an electric dispersion reactor.

The following is an example of a preparation of hydrous titanium oxide spherules. A broth recipe was used that had final mole ratios of HMTA/Ti and HMTA/H$^+$ of 2.33 and 1.69, respectively. As mentioned previously, the moles of H$^+$ relate only to the HCl added to make the broth, not related to the H$^+$ that results from the hydrolysis reaction. The respective concentrations of Ti, HMTA, urea, and HCl in the broth were 0.6M, 1.39M, 1.39M, and 0.82M. The forming temperature was 90° C. The process parameters for this example were chosen from the formulations given in EXAMPLE 5. FIG. 1 shows the apparatus used for the production of gel-spherules by a gel-spherule internal gelation process.

EXAMPLE 1

Separate stock solutions of HMTA/urea (3.2M HMTA plus 3.2M urea) and of $TiCl_4$/HCl (1.64M $TiCl_4$ plus 2.25M HCl) were prepared. HMTA was obtained from Fisher Scientific Company Chemical Manufacturing Division, Fair Lawn, N.J., Lot #713300. Urea was obtained from EM Science, a division of EM Industries, Inc., Cherry Hill, N.J., Lot #6064.

A 2 L HMTA/urea stock solution was prepared by mixing 889 g HMTA with 385 g urea with deionized water in an ice bath until the solution cleared of crystals. Unlike most compounds, the solubility of HMTA increases as the temperature decreases. In the presence of urea, of equal molar concentrations, the maximum concentration of HMTA is approximately 3.2M. The $TiCl_4$/HCl stock solution that was used in this hydrous titanium oxide spherule preparation had a $TiCl_4$ concentration of 1.64M and HCl concentration of 2.25M. About 360.5 mL of $TiCl_4$ (obtained from J. T. Baker Company, Phillipsburg, N.J. 08865, Lot #25609) and 800 mL of 5.625M HCl were used. The $TiCl_4$ was added slowly with mixing to the chilled acid solution. The temperature of the mix was maintained between 0 and 20° C. during the addition. Afterwards, the solution was carefully transferred to a 2 L volumetric flask and solution volume was adjusted to 2 L with deionized water. To check the free acid of the stock solutions, small samples were titrated with standard 0.1M NaOH.

A 412.5 mL broth solution was prepared by slowly adding and mixing 180 mL of the above HMTA/urea stock solution, which was pre-chilled to ice bath temperature, to 150 mL of the $TiCl_4$ stock solution, which was diluted with 82.5 mL of deionized water and also chilled to ice bath temperature. The chilled broth was then added to the chilled apparatus broth pot 1 and processed through the gel-forming or spherule-forming apparatus. During the run, silicone oil was used as the water-immiscible organic medium and carrier for the broth droplets as they gelled. The temperature of the silicone oil was maintained at approximately 90° C. and a 18 gauge stainless steel needle 3 was used in the two-fluid nozzle 5. The broth droplets started gelling in approximately 9 seconds after being introduced in the hot organic medium. The laboratory-scale apparatus, FIG. 1, used to make the hydrous titanium oxide spherules consisted of a reservoir 7 for heating the silicone oil, a pump 9 for circulating the silicone oil, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the silicone oil from the gelled spherules.

The silicone oil reservoir 7 was a stainless steel open-top rectangular container that was 7 in. wide by 8.25 in. long and 11.5 in. deep. Two 250 watt stainless steel heating blades 17 were positioned at the rear of the reservoir to heat the oil. A thermocouple 19 that was positioned in the basket at the bottom and near the front of the reservoir was connected to a temperature controller 21 which was used to control the oil temperature. A magnetic stirrer 23 with its stainless steel shaft positioned between the two heating blades and its stainless steel impeller located near the bottom of the reservoir was used to mix and maintain the oil at the desired temperature. Taking up most of the front space in the reservoir 7 was a large removable stainless steel wire-mesh (150 $\mu$m) basket 15 which served as a backup to prevent any spilled gelled spherules from being pumped out of the reservoir to the circulating pump.

An Eastern D-11 centrifugal pump 9 was used to pump the hot oil from the reservoir 7 through a ¼-ID stainless steel line to the vertically positioned glass gelation column 11. The flow from the pump was divided into two streams which were controlled by manual valves. The flow of one of the streams was routed to a position that was about 9 in. above the center of the top of the gelation column. Vertically attached to this line was a ¼-in.-ID and ⅜-in.OD plastic tube whose outlet end was inserted about 2-in. into the entrance of the gelation column. The plastic tube was part of the two-fluid nozzle system that was employed to control the size of the droplets. The other hot silicone oil stream from the pump was routed to glass fitting at the bottom of the gelation column and flowed up through a shell 25 that surrounded the central gelation tube 11. The hot oil overflowed at the top of the column, first, into the central tube 11 and, then, into an overflow cup 27. A large plastic tube 29 was connected to a glass fitting from the overflow cup 27 to route the overflow back to the hot oil reservoir 7. During operations, the flow of oil from the heating shell 25 was normally adjusted to provide only a slight overflow.

The two-fluid nozzle system 5 was very simple; it consisted of a flat-tipped stainless steel hypodermic needle, 18 gauge (19 or 20 gauge can also be used), 3 which was perpendicularly inserted through the wall of the plastic tube to the midpoint of the hot silicone oil carrier stream and was positioned approximately 5-in. above the entrance to the gelation column 11. The chilled broth was jetted into the laminar flowing oil by air pressurizing the broth pot 1, forcing the broth out a tube at the bottom of the broth pot through a short plastic line that was connected to the hypodermic needle 3. The size of the droplets formed was dependent upon the gauge of the needle used and the flow rates of the hot silicone oil and of the broth.

The hot oil carrying the droplets from the two-fluid nozzle tube 5 flowed directly into the central concurrent flow tube of the jacketed gelation column 11 where it is desirable for the droplets to begin to gel. On exiting the gelation column 11, the gelling spheres flow into a plastic serpentine transport line-(¼-in.-ID and 1/16-in.-OD) 13. This line was long enough (about 8 ft.) to allow the gelling spherules to have a total residence time of 25 to 35 seconds to the collection basket 15. The transport time also included the time the spherules were passing through the 62-cm long gelation column. The gelation column and serpentine transport system was designed to be a siphoning system with a gravity head of about 60-cm for oil temperature 55° to 100° C.

The product collector 15, a cylindrical stainless steel wire mesh (150 $\mu$m) basket which was positioned above the hot oil reservoir 7, was used to collect and separate the gel spherules from the hot oil as it exited the serpentine transport line 13. The collected gel spherules were aged by lowering the product collector 15 into the reservoir 7 for 20 minutes, normally between 15 and 30 minutes. After aging, the bulk of the oil was drained from the gel spherules and the residual oil was removed by a series of washing steps with trichloroethylene (TCE), with 0.5M $NH_4OH$, and then with deionized water to remove the reaction impurities.

Another basket of similar design was also positioned above the hot oil reservoir to filter the return oil from a plastic tube which was connected to the overflow drain line at the top of the gelation column.

A volume of approximately 456 mL of gel-spherules were obtained.

Most of the gel-spherules were white and opaque. The average compression strength of about 20 spherules that were selected at random were determined by dynamometric measurements to be 40±5 g. These spherules had excellent strength and, by the collins rating method previously described, would be considered hard gels with a rating between 7 collins to 8 collins.

The gel spherules were then air dried to give them better compression strength for use in ion exchange columns. This was done by air drying them in a large stainless steel pan to a constant weight. The weight of the spherules was 35.5 g after 5 days and 32.1 g after 14 days. The average compression strength was determined by dynamometric measurements to be about 2500 g. The size of the spherules ranged from about 300 to 840 $\mu$m in diameter. (For use as inorganic ion exchangers, it is not important to dry the gel spherules to a constant weight; normally, a drying period of three to five days is adequate. Retention of some of the interstitial water and water of hydration has an important impact on its sorption behavior. Prior to using the dried spherules as sorbents, it is recommended that they be soaked in water for a 24 hour period.)

The following examples, EXAMPLES 2, 3, 4 and 5, illustrate the window of optimum broth formulations for making hydrous titanium oxide gel-spherules or gels of other shapes or configurations by the internal gelation process for the temperature ranges of 60° C.±5°, 70° C.±5°, 80° C.±5°, and 90° C.±5°, respectively. The broth formulations in EXAMPLE 2 for 60° C.±5°, can also be used for temperatures below 55° C. When broth droplets are gelled at temperature <55° C., the gelation times are >30 seconds for all the formulations, producing soft gels. For gel preparations made at temperatures above 95° C., the broth formulations in Examples 5 are used. Temperatures of 95° C. and below are recommended since the broths boil at temperatures between 100° and 104° C. and gases are generated which cause the gels to crack. All of the broth formulations in each of the examples are stable for ≧1 hour at a temperature of 0° C. to 5° C. The same method and apparatus as described in EXAMPLE 1 are used to make the gel-spherules. The concentration of titanium for the broths defined in these windows is about 0.6M. The suggested range for the concentration of the titanium in the broth is from 0.5 to 0.8M; however, a larger range of 0.4 to 1M can be used. While maintaining the mole ratios of the HMTA/Ti and HMTA/H$^+$, diluting the broths generally tends to give less rigid gels or softer gels that have longer gel times. Broths with titanium concentrations as low as 0.4M give gels that are too soft to use.

In FIGS. 2, 3, 4, and 5, gel times for the spherules are plotted as a function of the HMTA/H⁺ and HMTA/Ti mole ratios for the broth formulations in Examples 2, 3, 4, and 5, respectively. The relative rigidities are also given.

The ranges of the HMTA/Ti and HMTA/H⁺ mole ratios of the optimum process window of the present invention are from 1.5 to 2.75, and 0.9 to 3.5, respectively, for the temperature 0° to 100° C. This window also includes a range of titanium concentrations from 0.4 to 1 molar. All these broths formulations are stable (clear and gel free) at 0° C. for one hour or more; many for several hours. Key information about gelation times and gel rigidities of the spherules as a function of temperature for the broth formulations of the window can be obtained in Examples 2, 3, 4, and 5 and from FIGS. 2, 3, 4, and 5. The titanium concentration for each of the broths for these examples and figures was 0.6 molar.

EXAMPLE 2

The same method and apparatus as described in EXAMPLE 1 were used to set the parameters for gels forming at temperatures of 60° C.±5° described in this example. At these particular reaction temperatures of 60° C.±5° C., broth formulations with HMTA/Ti and HMTA/H⁺ mole ratios in the ranges of 2.00 to 2.75, and 0.9 to 3.5, respectively gelled in ≦30 seconds. Broth formulations with HMTA/Ti and HMTA/H⁺ mole ratios in the ranges of 2.25 to 2.75 and 1.3 to 3.3, respectively, gelled in 21 to 30 seconds. All the gels within these ranges were given rigidity ratings of 4 collins and 5 collins, according to the rigidity scale previously described. These gels were soft to medium gels.

Figure 2:
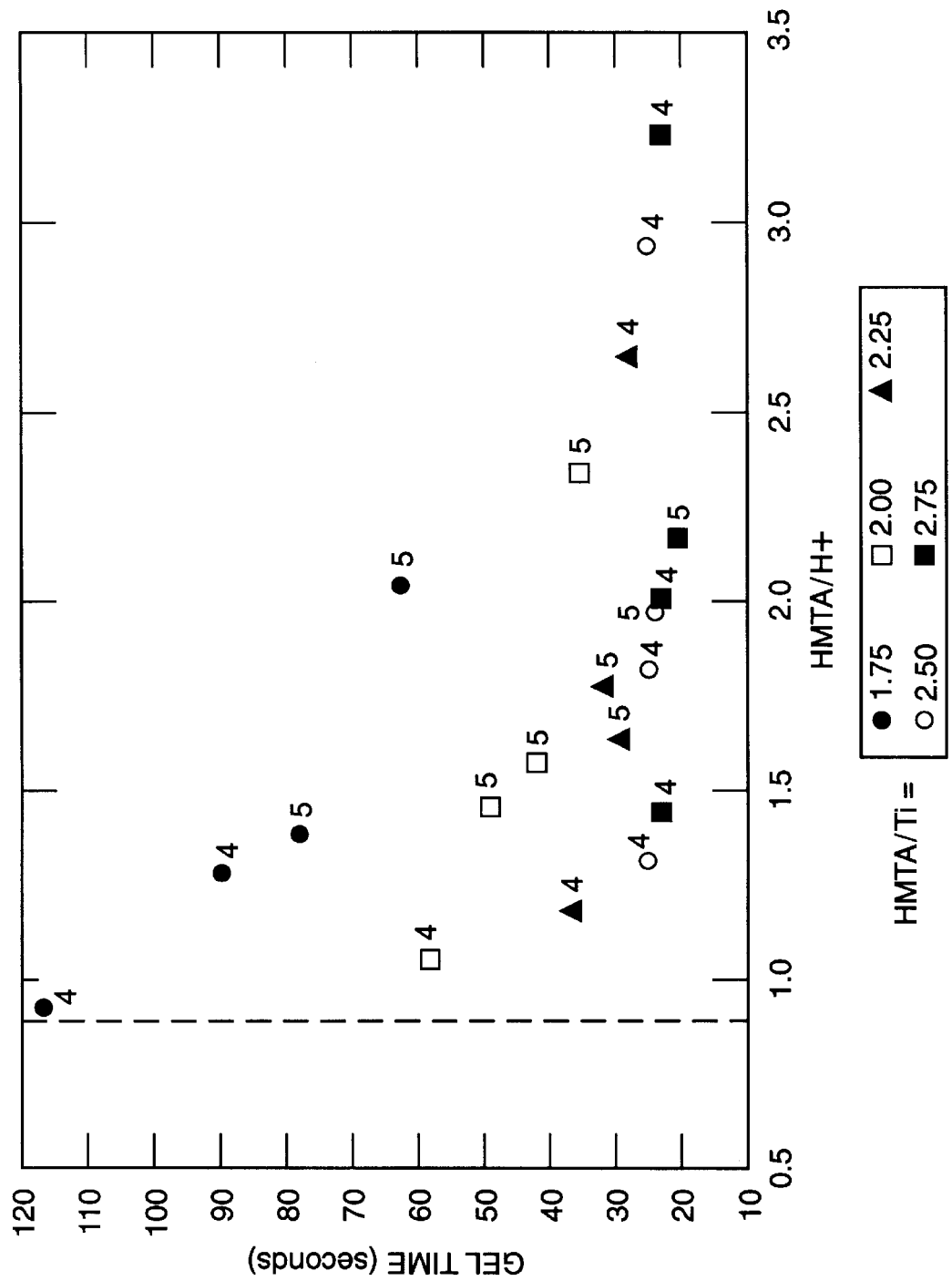
FIG. 2 reflects the data obtained in EXAMPLE 2 for making gel-spherules at gel-forming temperatures of 60° C.±5°.

FIG. 2 reflects the data obtained in EXAMPLE 2 showing that the broth formulations for making gel spherules that gel in ≦30 seconds have mole ratios of HMTA/Ti and HMTA/H⁺ mole ratios in the ranges of 2.00 to 2.75, and 0.9 to 3.5, respectively. The shortest gel time for a broth within this portion of the window is about 20 seconds. Most of the gels in this region of the window, as well as the rest of the window in which the broths have gel times greater than 30 seconds, have rigidities in the scale range of 4 collins to 5 collins. These are soft to medium gels. The range of gel times for broths with HMTA/Ti and HMTA/H⁺ mole ratios ranging from 2.25 to 2.75 and from 1.3 to 3.3, respectively, was 21 to 30 seconds.

EXAMPLE 3

Again, the same method and apparatus as described in EXAMPLE 1 were used to set the parameters for gels forming at temperatures of 70° C.±5° described in this example. At these particular reaction temperatures of 70° C.±5°, broth formulations with HMTA/Ti and HMTA/Ti⁺ mole ratios in the ranges of 1.75 to 2.75, and 0.9 to 3.5, respectively gelled in ≦30 seconds. Broth formulations with HMTA/Ti and HMTA/H⁺ mole ratios in the ranges of 2.00 to 2.75 and 1.0 to 3.3, respectively, gelled in 13 to 30 seconds. Most of the gels in this region of the window, as well as the rest of the window in which the broths have gel times greater than 30 seconds, had rigidities in the scale range of 3 collins to 6 collins with mostly ratings of 5 collins. These were also soft to medium gels.

Figure 3:
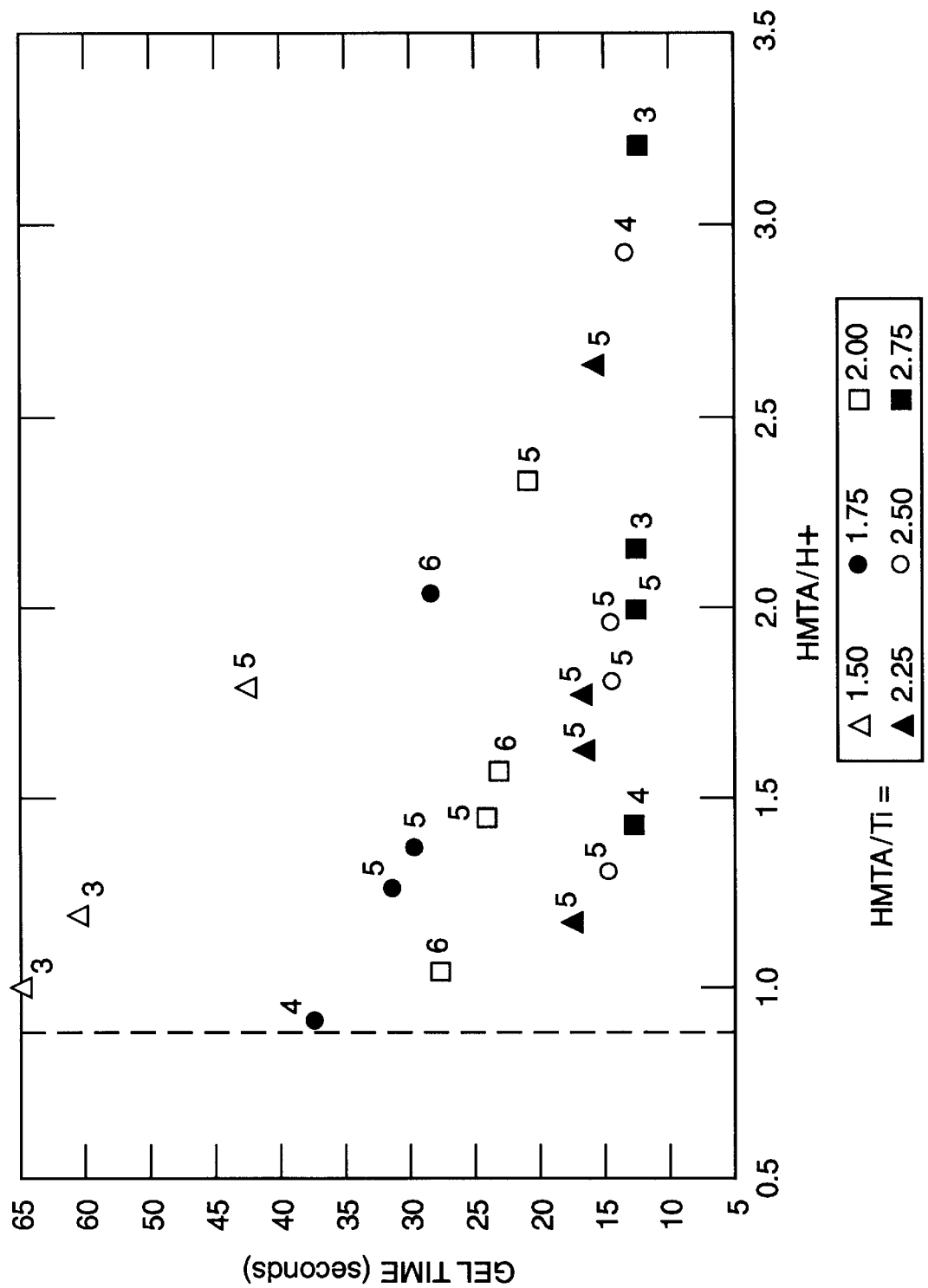
FIG. 3 reflects the data obtained in EXAMPLE 3 for making gel-spherules at gel-forming temperatures of 70° C.±5°.

FIG. 3 reflects the data obtained in EXAMPLE 3 for making gel-spherules, showing that at gel-forming temperatures of 70° C.±5°, broth formulations in the window with HMTA/Ti and HMTA/H⁺ mole ratios of ≧1.75 and ≧0.9, respectively, are required to obtain gelation times of ≦30 seconds. The range of gel times for broths with HMTA/Ti and HMTA/H⁺ mole ratios ranging from 2.00 to 2.75 and from 1.0 to 3.3, respectively, was between 13 and 30 seconds. For this range of temperature, only gels with rigidity ratings of 3 collins, 4 collins, 5 collins, and 6 collins can be made. The recommended broth formulations for making sorbents as spherules are those that have relative rigidities ratings of 5 collins and 6 collins.

EXAMPLE 4

The same method and apparatus as described in EXAMPLE 1 were used to set the parameters for gels forming at temperatures of 80° C.±5° described in this example. At these particular reaction temperatures of 80° C.±5° C., broth formulations with HMTA/Ti and HMTA/H⁺ mole ratios in the ranges of 1.5 to 2.75, and 0.9 to 3.5, respectively gelled in ≦30 seconds. The gels produced ranged in rigidity from 3 collins, being soft gels, to 8 collins, being the hard gels, according to the collins rigidity scale previously described.

Figure 4:
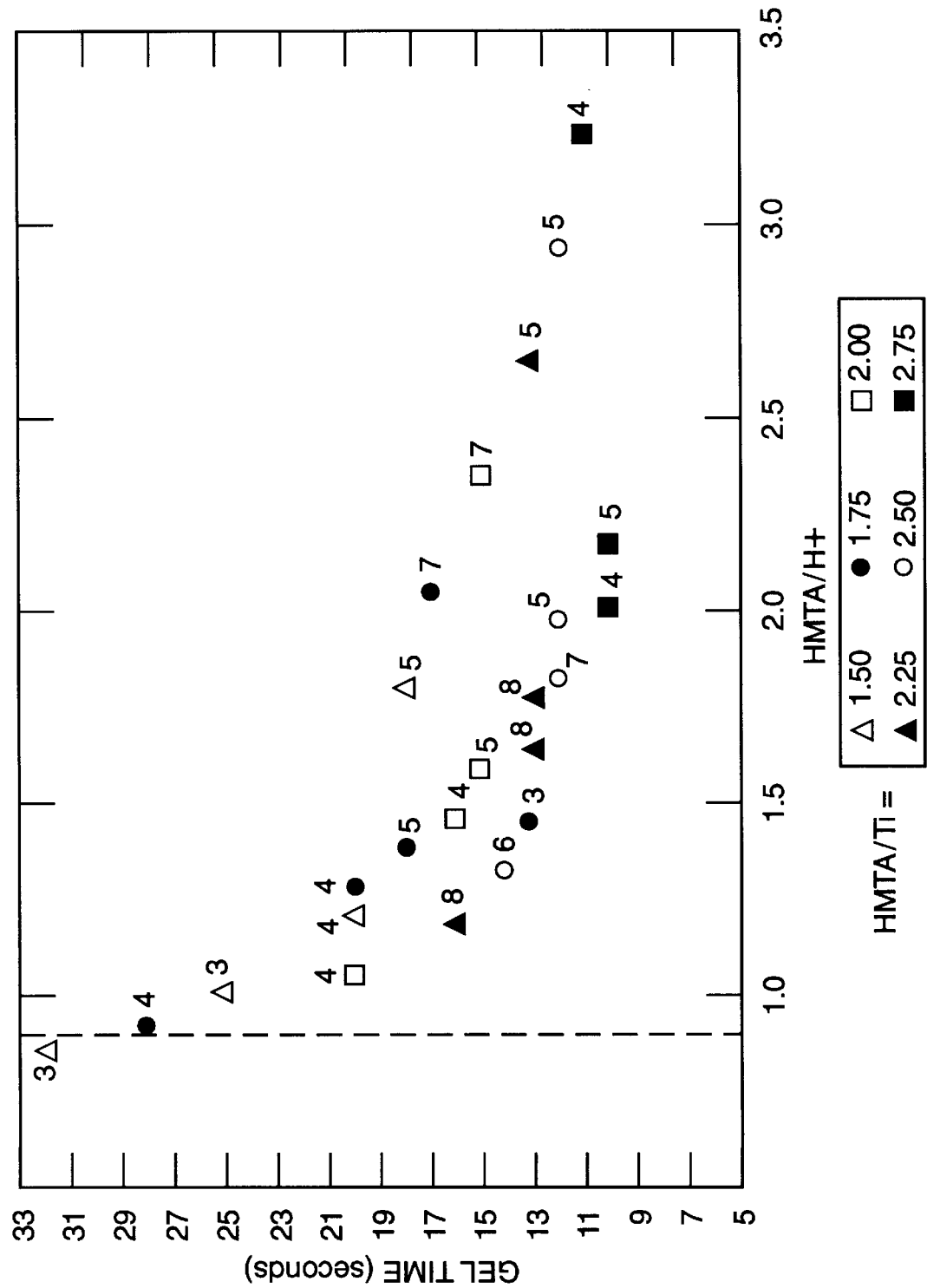
FIG. 4 reflects the data obtained in EXAMPLE 4 for making gel-spherules at gel-forming temperatures of 80° C.±5°.

FIG. 4 shows the data obtained in EXAMPLE 4 for making gel-spherules which shows at gel-forming temperatures of 80° C.±5°, broth formulations with HMTA/Ti mole ratios of 1.5 to 2.75 and HMTA/H⁺ mole ratios between 0.9 and 3.5 are required to obtain gelation times of ≦30 seconds. It can be seen in FIG. 3 that there are zones within the broth formulation window wherein harder, more rigid gels of ratings of 7 collins and 8 collins, are formed. None of the broth formulations in the windows of the previous examples formed gels that were rated as 7 collins or 8 collins at temperatures ≦75° C., as can be seen in FIGS. 1 and 2 for EXAMPLES 2 and 3. However, there are also zones of broth formulations within the window of EXAMPLE 4 which also produce soft and medium gels (ratings of 3 collins, 4 collins, 5 collins, and 6 collins).

EXAMPLE 5

The same method and apparatus as described in EXAMPLE 1 were used to set the parameters for gels forming at temperatures of 90° C.±5° described in this example. At these particular reaction temperatures of 90° C.±5°, broth formulations with HMTA/Ti and HMTA/H⁺ mole ratios in the ranges of 1.5 to 2.75, and 0.9 to 3.5, respectively gelled in ≦30 seconds. The range of gel times for these broths was 8 to 20 seconds. The gels produced ranged in rigidity from 4 collins, being soft gels, to 8 collins, being the hard gels, according to the collins rigidity scale previously described. For making hydrous titanium oxide spherule sorbents, the recommended gels are medium to hard in a range from 6 collins to 8 collins.

FIG. 5 reflects the data obtained in EXAMPLE 5 for making the spherules, showing at gel-forming temperatures of 90° C.±5°, broth formulations with HMTA/Ti and HMTA/H⁺ mole ratios of ≧1.50 and ≧0.9, respectively, are required to obtain gelation times of ≦30 seconds. The range of gel times for broths with HMTA/Ti and HMTA/H⁺ mole ratios ranging from 1.50 to 2.75 and from 0.9 to 3.5, respectively, was 8 to 20 seconds, all well within the desirable range of ≧30 seconds for making gel-spherules.

The preparation of titanium oxide spherules ($TiO_2$) made by heating hard gelspherules produces more dense, less porous gel-spherules having smaller crystals. Furthermore, the most dense $TiO_2$ spherules are ones that are dried in air or oxygen with no steam. Broth formulations that provide gels having rigidity ratings of 5 collins, 6 collins, and 7 collins yield $TiO_2$ spherules that are less dense or more porous. These materials have larger crystals. Crystal growth is also enhanced by drying the spherules in a steam atmosphere.

Broth formulations that yield soft gels (4 collins and 3 collins) also have large crystals and are more porous; however, these formulations are not used to make oxide catalysts or "getters" because most of them have a tendency to crack when dried. All the gel-spherule formulations within the optimum process parameter window are used to make hydrous titanium oxide sorbents because the gel-spherules do not crack when they are only air-dried. Broth formulations that provide hydrous titanium oxide gels with 5 collins, 6 collins, and 7 collins rigidity ratings are the preferred sorbents. Furthermore, spherules that are made from these broth formulations also work best when used in conversion reactions to make other sorbents as spherules.

Chemical conversions of hydrous titanium oxide spherules to many other inorganic ion-exchanger spherules such as titanium compounds of phosphate, selenite, arsenate, tungstate, molybdate, antimonate, rehenate, vanadate, ferrocyanide etc. are possible via the use of the methodology and broth formulations of the present invention. For example, effective methods of making titanium monohydrogen phosphate and titanium ferrocyanide have already been experimentally determined. Amorphous, semi-crystalline or crystalline titanium monohydrogen phosphate can be made. The adsorption behavior is dependent upon the degree of crystallinity. Titanium monohydrogen phosphate has a layered structure and the distance between the layers is increased by making the material more crystalline. Cations with larger radii can more readily be sorbed within the matrix of the more crystalline material, increasing its load capacity. Also, by being able to control the degree of crystallinity, it is possible to control the sorptive selection of the exchanger for certain cations. It was found in the following example that the degree of crystallinity of the titanium monohydrogen phosphate depends upon the concentration of the phosphoric acid used and the rate and temperature at which the gel spherules were heated during conversion.

The following is an example of a method for converting hydrous titanium oxide (HTiO) spherules to titanium monohydrogen phosphate (TiHP). The conversion conditions described herein provide a relatively quick and unique means of preparing stable TiHP spherules as amorphous, semi-crystalline, or crystalline material for use as ion exchangers.

EXAMPLE 6

Several batches of wet HTiO gel spherules were prepared using the method and parameters of EXAMPLE 1 for conversion to TiHP. First, about 250 mL of the HTiO gel spherules were rinsed twice with 0.5M phosphoric acid ($H_3PO_4$) for 24 hours. This step converted the external surface of the spherules to acid insoluble TiHP and allowed the spherules to be mixed with stronger concentrations of phosphoric acid. (Since hydrous titanium oxide dissolves at pHs of <1, this is a very important step.) Afterwards, the spherules were rinsed twice with 1.0M $H_3PO_4$, placed in a 500 mL beaker, and covered with 1.0M $H_3PO_4$. (Enough 1.0M $H_3PO_4$ was added to bring the volume up to about 450 mL.) The beaker was then sealed in a thickwalled stainless steel pressure vessel, 3 inches in diameter, 8 inches high with a wall thickness of one-half inch, and heated in a laboratory convection oven. (Improved heat transfer to the spherules was obtained by filling the narrow gap between the beaker and the inner walls of the vessel with water.) After heating the spherules to a predetermined temperature (70° to 100° C.), the vessel was removed from the oven and rapidly cooled in cold flowing water. The beaker was then removed and the spherules transferred to a stainless steel wire mesh basket in which they were repeatedly rinsed and soaked with deionized water to remove any unreacted phosphoric acid. The spherules were then air dried to a constant temperature. The acid insolubility of the converted TiHP spherules was determined by mixing 1 mL volume of the spherules with 2 mL of 8M $HNO_3$ for 24 hours in a graduated polypropylene centrifuged tube. If the TiHP spherules contained significant amounts of unconverted, acid soluble HTiO, the spherules would fall apart.

The conversion vessel used had a stainless steel flanged top with a stainless steel thermowell which dipped down into the phosphoric acid. A thermocouple placed in the thermowell allowed the temperature of the spherules to be measured continuously. It was discovered that if a vessel was placed in a laboratory convection oven that had been preheated to about 135° C., the wet HTiO gel spherules could be converted to different crystalline forms of TiHP by slowly heating the spherules from ambient temperature to temperatures up to 100° C. A slow ramp of about 3 hours heating was required to reach 100° C. Under these conditions, there was no loss of sphericity; however, when the spherules were heated at temperatures above 100° C., the spherules became fragile and broke into particles and powder. Amorphous spherules were prepared at temperatures up to 70° C. (1.5 hours heating), semicrystalline spherules were made in the temperature range of 70° to 80° C. (1.5 to 2.2 hours heating), and crystalline spherules were made in the temperature range of about 80° to about 100° C. (2.2 to 3 hours heating). Having the oven set at higher temperatures and using stronger concentrations of phosphoric acid increased the rate of temperature which made it more difficult to reproducibly control the tailoring of the crystallinity because of shorter conversion times.

Based upon batch equilibration tests for the removal of uranium, americium, cesium, and strontium from different waste stream (both simulant and actual waste), the best TiHP materials for ion exchange use were the spherules that were heated to a temperature between 85° and 90° C. with a heating ramp requiring 2.2 to 2.5 hours. These spherules were a whitish crystalline material that maintained their sphericity when used in the batch tests. Prior to batch testing, the dried spherules were preconditioned by soaking them in deionized water for about 24 hours. A paper by J. L. Collins et al, entitled "Batch Test Equilibration Studies Examining the Removal of Cs, Sr, and Tc from Supernatants from ORNL Underground Storage Tanks by Selected Ion Exchangers", published in the Proceedings of Second International Conference of Waste Management: "Challenges and Innovations in the Management of Hazardous Waste," in Washington, D.C., May 10–12, 1995 hereby incorporated herein by reference, describes the removal of strontium with crystalline TiHP spherules from an ORNL waste stream.

As previously pointed out, oxides and phosphates of titanium are excellent ion exchangers. Other inorganic ion exchangers, such as ammonium molybdophosphate (AMP), hexacyanoferrates, polyantimonic acid, sodium titanate, sodium silicotitanate, etc. could be homogeneously embedded as fine powder in these spherules.

Spherules of hydrous titanium oxide and titanium monohydrogen phosphate that were embedded homogeneously with very fine particles of potassium cobalt hexacyanoferrate $K_2[CoFe(CN)_6]$ have been successfully used for removing highly radioactive fission products from hot cell waste solutions. The mixed spherules were also very effective in removing cesium and strontium from supernatant taken from the Melton Valley Storage Tank facility at ORNL, Oak Ridge, Tennessee, as described in *Evaluation of Selected Ion*

*Exchangers for the Removal of Cesium from MVST W-25 Supernate*, ORNL/TM-12938, April 1995, hereby incorporated herein by reference.

The keys in this invention to making composite spherules as sorbents that can effectively remove cesium and strontium from waste streams are (1) to use broth formulations that provide structurally strong gels with adequate interconnecting porosity which allow the cesium and strontium cations to diffuse easily into the matrix of the spherules, and (2) to optimize the weight percentage of the fine particles of $K_2[CoFe(CN)_6]$ embedded without plugging the surface openings and pore channels. To minimize the settling of particles in the broth droplets prior to gelation, broth formulations with the shortest gelation times (5 to 10 seconds) are preferred. Composite HTiO and TiHP spherules in which the weight percentage of $K_2[CoFe(CN)_6]$ was varied from 6% to 32% were prepared and tested. All these sorbents worked well in removing cesium. The range of optimum weight percentage of $K_2[CoFe(CN)_6]$ was between 15% and 20%. Similar composite spherules containing $Na_2[CoFe(CN)_6]$ were also prepared with similar results.

The following is an example preparation in which HTiO spherules were made that contained 21%$K_2[CoFe(CN)_6]$ by weight.

EXAMPLE 7

A 412.5 mL broth solution was prepared by slowly adding and mixing 180 mL of the (3.2M HMTA-3.2M urea) stock solution (see EXAMPLE 1), which was pre-chilled to ice bath temperature between 0° and 20° C., to 150 mL of the (1.64M Ti/2.25M HCl) stock solution, which was diluted with 9 mL of deionized water and also chilled to ice bath temperature. The chilled broth was then added to a specially designed chilled broth pot which contained a mixing device for keeping solid particles suspended and a vibrator on the Nalgene outlet tube to the two-fluid nozzle. A 73.5 mL slurry containing about 8.53 g $K_2[CoFe(CN)_6]$ was added to the broth. The slurry was prepared beforehand by slowly adding, with mixing, 49 mL potassium ferrocyanide [$K_4Fe(CN)_6$] to 24.5 mL cobalt nitrate $Co(NO_3)_2$ over a period of 30 minutes. During the run, the temperature of the silicone oil in the gelation column was maintained at approximately 90° C. and a 18 gauge stainless steel needle was used in the two-fluid nozzle. The broth droplets started gelling in about 9 seconds. The collected gel spherules were aged 20 minutes, washed several times with TCE to remove the residual oil, and then washed with solutions of 0.5M $NH_4OH$ and then with deionized water to remove the reaction impurities. The gel spherules were then air dried to give them good compression strength for use in ion exchange columns. This was done by air drying them in a large stainless steel pan to a constant weight. The size of the spherules ranged from about 300 to 840 $\mu$m in diameter with most of them being in the 350 to 500 $\mu$m range.

The conversion steps described in EXAMPLE 6 were employed on a batch of washed gelled spherules containing 21%$K_2[CoFe(CN)_6]$ in which the HTiO was converted to TiHP by the method in EXAMPLE 6. These spherules were also very effective in removing strontium, cesium, and uranium from different waste streams.

In the last decade, there has been much attention given to the treatment of air and water with titanium oxide photocatalysts. Titanium oxide is a semiconducting material that produces electron-hole pairs when illuminated with ultraviolet (UV) radiation of wavelength of 390 nm or less. These holes can migrate to the surface of the catalyst and produce hydroxyl radicals through the oxidation of water. The oxidizing radicals then oxidize other species in the solution, such as organics. Titanium oxide, $TiO_2$, in the anatase form, has been used to photocatalytically convert toxic organics such as phenols, benzene, chlorocarbons, etc. to nontoxic forms. The present invention (EXAMPLE 8) provides a means of making $TiO_2$ (anatase form) photocatalysts as spherules that have good flow dynamics and surface area.

The titanium oxide spherules help to solve the problem of surface fouling. The degradation of organics tends to cause a gummy coating on the surface of the catalyst which slows or stops the catalytic reactions. Using $TiO_2$ spherules in conjunction with a fluidized bed would allow the spherules to be quickly removed and regenerated in an acidic bath. The contact time and acidity of the bath would have to be determined to minimize the degree of surface dissolution. Some loss of material surface would not be a problem because the underlying material is the same. A cyclic system could be developed to allow for a continuous treatment process.

EXAMPLE 8

Wet HTiO gel spherules that were prepared as described in EXAMPLE 1 were placed in a stainless steel mesh liner inside a heating unit that allowed moist air to uniformly flow through the bed of spherules while heating. Air or oxygen to the unit was first passed through a steam generator that was always heated at a temperature a few degrees lower than the temperature of the heating unit. This prevented condensation of the steam in the heating unit. The spherules were first slowly heated to 90° C. over a period of about 6 hours to remove most of the free water within the spherules. Vaporizing the water from the spherules too quickly caused the spherules to crack and break apart. Afterwards, the spherules were heated to 600° C. in the flowing moist air, 200 to 400 $cm^3$/min., and held at that temperature for several hours before cooling. The temperature of the steam generator was maintained at 95° C. during that period. Its temperature never exceeded 95° C.

Rutile forms at temperatures greater than or equal to 1040° C. EXAMPLE 8 can be used to prepare titanium oxide spherules as rutile by simply heating the spherules to 1040° C. or greater rather than 600° C. In addition, titanium oxide in the rutile form has a very high dielectric property. A polarized bed of spherules of rutile can be used to capture charged and/or polarized particles from liquid streams.

In addition to treatment of waste streams of liquids or gases, catalysts prepared by this invention have the potential for many other commercial applications. In the manner described in Example 7, spherules can also be made in which very fine particles of other chemicals, metals, and biochemicals can be homogeneously dispersed throughout the matrix.

Catalysts and getters made as pure materials of titanium oxide spherules provide the means for good flow dynamics and maximum surface area utility. To create more surface area for instance, broths are prepared with embedded particles of materials as zinc or nickel that are dissolved and removed from the gel-spherules or the air-dried spherules to create interconnecting pores within the spherules. This is described in Example 9.

The spherules of EXAMPLES 8 and 9 are examples of getters as well as catalysts. These spherules can be used as getters or as trapping materials. Many metal oxides are known to be very effective as "getters" in removing volatile fission products from off-gas streams over a broad range of temperature. Getters are trapping materials. For example, quartz wool ($SiO_2$) is used to remove volatile radioactive cesium from the off-gas stream of gas cooled nuclear reactors in Great Britain. Other oxides such as those of titanium, zirconium, aluminum, thorium, uranium, etc. could also be used as getters to remove the volatile cesium from the off-gas streams of high temperature waste treatment processes such as vitrification, incineration, etc. that are being used to treat or stabilize radioactive waste streams.

EXAMPLE 9

Anatase or rutile spherules with enhanced porosity can be made by the method of EXAMPLE 7 using powdered nickel or zinc rather than $K_2[CoFe(CN)_6]$. The desired porosity is dependent upon the particle size of the nickel or zinc and the mass used. The nickel or zinc is added to 73.5 mL of water. After removing the silicone oil from the spherules with TCE, the spherules are washed with water to remove the reaction impurities. Afterward the spherules are air dried for three to four days. The nickel or zinc particles are then dissolved by soaking the air-dried spherules several times with 3 to 4M $NH_4OH$. The zinc and nickel are dissolved by forming $Zn(OH)_4^{-2}$ and $Ni(NH_3)_6^{+2}$ complexes.

As an alternate method of enhancing the porosity, organic anion resin particles can also be embedded as described for the nickel or zinc. In this case, the particles would be removed in the drying step as described in EXAMPLE 8. Oxygen and steam would be used to lessen the possibility of residual carbon in the matrix of the spherules. Also, the temperature would have to be raised very slowly to assure a slow release of the gas from the decomposing resin. If not, the spherules would crack.

The present invention provides a novel means of making titanium oxide fiber material with high surface area that could be used as a catalytic medium for organic conversion reactions. The porosity of the titanium oxide can be tailored by varying the broth formulation, gelation temperature, aging time, and drying conditions. Fiber mats can also made in which the titanium oxide fibers contain particles of other catalytic material (either metals or oxides) which are homogeneously embedded. To maintain the strength of a composite fiber, the weight percentage of other material added should be $\leq 20\%$ and it is important that the particles of the other catalytic material such as nickel, platinum, iron oxide, etc. be as small as possible.

EXAMPLE 10

To make the matted fiber materials, either pure HTiO gel spherules as in EXAMPLE 1 or gel spherules of HTiO that are composited with other catalytic material by the method of EXAMPLE 7 would be prepared without drying them. These spherules are then introduced into a single screw extruder and extruded through a die containing numerous micro orifices with inner diameters in the range of 50 to 200 $\mu$m. Depending upon the broth formulation, gelation temperature, and the aging time employed to make the gel spherules, the extruded strands of HTiO or composited HTiO would shrink by a factor of 10 to 15 upon being dried. Flexible fibers with diameters in the range of 2 to 20 $\mu$m can be made. The extruded gelatinous strands of hydrous titanium oxide are directed downward onto collection plates positioned on a slow moving conveyor belt having a traverse motion moving side to side, back and forth, so to provide the desirable mat thickness of the collected strands. The drying method used depends upon the fibrous product desired and the crystal morphology of the fibrous product desired is dependent upon the drying method. The collection plates are made of Teflon and/or coated in a way to prevent or minimize sticking of the gel strands to the collection plates. The HTiO in the strands can then be converted to the anatase polymorphic form by heating them in air or oxygen to a temperature $\leq 860°$ C. The HTiO strands can also be converted to brookite if heated to a temperature between 860° C. and 1040° C. The HTiO strands can further be converted to rutile if heated above 1040° C. The method of steam heating that is described in EXAMPLE 8 can also be used to help make stronger fibers that are less likely to crack.

The apparatus used to make hydrous titanium oxide sorbents as spherules from EXAMPLE 1 can not be used to effectively make spheres with diameters less than 100 $\mu$m which are needed for use as ceramic precursors. However, broth formulations from the present invention can be used to make small particles, about 0.1 to 0.5 $\mu$m, by the electric dispersion reactor (EDR). The EDR method, described in U.S. Pat. Nos. 5,122,360 and 5,207,973, hereby incorporated herein by reference, discloses an aqueous solution with water soluble salt or salts that is added dropwise into an immiscible organic solution of 2-ethyl-1 hexanol, which contains a precipitating agent such as ammonium hydroxide or oxalic acid. The drops are dispersed into micro-droplets by a high-intensity pulsed electric field and are precipitated by one of the precipitating agents. In the present invention, broth formulations can be chosen from the window of optimum process parameters, which is defined and taught by EXAMPLES 2, 3, 4 and 5, to provide even more control of the crystal morphology and surface properties for use as ceramic precursors. The present invention provides control over the gelation time of the micro-droplets and no precipitating agents have to be added to the organic phase. Also, the present invention allows other immiscible organics to be used (see EXAMPLE 1) in the EDR, which in turn allows for a wider range of temperature to be used for gelation. In the present invention, both broth formulation and temperature are important in controlling the properties of the gels.

EXAMPLE 11

To make small spherules using the EDR, the organic mediums of choice would be a mixture of 75% perchloroethylene and 25% iso-amyl alcohol for temperatures $\geq 70°$ C. and trichloroethane for temperatures $\leq 70°$ C. (see discussion in EXAMPLE 1).

To make small spherules that are very dense, a broth formulation from EXAMPLE 4 of the optimum process parameter window can be chosen to give a hard gel. The organic medium is heated at 80° C.±5°. A broth composition with a HMTA/Ti mole ratio of 2.25, HMTA/H$^+$ mole ratio of 1.65, and urea/Ti mole ratio of 2.25 and a titanium concentration of 0.6 mol/L can be used. The gelation time for this formulation for the larger spherules is about 12 seconds. For the EDR system, the time is even less because the droplets are much smaller. Because the hydrous titanium oxide spherules shrink considerably upon drying to the oxide form, some additional control of the spherule size is possible by varying the concentration of the titanium. The same quality of gel spherule is maintained using the same mole ratios. Broths with the lowest titanium concentration would shrink the most.

If the temperature of the organic phase is lowered to 70° C. using the same broth formulation above, only gel spherules of medium rigidity can be made. To make a gel of medium rigidity at 80° C., the broth formulation has to be altered. For a broth with a titanium concentration of 0.6 mole/L, the mole ratios of the HMTA/Ti and HMTA/H$^+$ are increased to 2.5 and 2.0, respectively.

One of the more important materials that can be made as a ceramic precursor via the present invention is barium titanate. Barium titanate (BaTiO$_3$) has a large permittivity (dielectric constant) of about 3600 and has many potential uses in the electronic industry, particularly in the area of computer and electronic circuitry. Small hydrous titanium oxide spherules made in the EDR apparatus using broth formulations from the optimum process parameter window defined in EXAMPLES 2, 3, 4 and 5 can be converted to barium titanate by two or three methods.

EXAMPLE 12

One method for converting the hydrous titanium oxide spherules, made by EXAMPLE 11, is a modified version of the conversion method described by O. J. Heinonen et al in a publication entitled "Sorption of Strontium(II) and Radio Strontium Ions on Sodium Titanate," *Radiochimica Acta*, 28 (1981), pp.93–96, hereby incorporated herein by reference. After being washed with ammonium hydroxide and water to remove the reaction impurities, the hydrous titanium oxide spherules from the EDR are soaked in ethanol to displace the free water in the spherules with ethanol. The ethanol is then drained from the spherules and the spherules placed in a heating vessel which contains a solution of barium ethoxide in which the Ba/Ti mole ratio≦2. A mole ratio of 4 to 6 might be best. The solution is then heated to 74° to 80° C. for a period of 3 to 10 hours, while mixing vigorously with N$_2$ gas to convert the spherules to the titanium(IV) ethoxide form. The heating vessel has a condenser to prevent loss of reaction solutions. Afterwards, about half the reaction solution is removed from the vessel and replaced with deionized water. To hydrolyze the spherules to barium titanate, the spheres are heated for about 5 to 10 hours while mixing vigorously with nitrogen gas. The reaction solution is then drained from the spherules and the spherules are washed well with deionized water. The crystal morphology of the barium titanate and the stability of the spherule is also dependent upon the drying method used. In most cases, a slow heating ramp and heating the spherules in a steam atmosphere is important.

Another possible method to use in converting the hydrous titanium oxide spherules to barium titanate is to place the spherules into a barium hydroxide solution in which the barium concentration is such that the mole ratio of the barium to titanium in the spherules is≦1. The spherules are then placed in a sealed stainless steel reaction vessel and heated at 200°±10° C. for a period of about 0.5 to about 5 hours to allow for conversion. After cooling the vessel to ambient temperature, the spherules are washed well with deionized water and dried.

HTiO gels potentially can be used in film, capillary, or gel slab electrophoresis. Electrophoresis is a technique that offers the greatest potential for obtaining rapid DNA sequence information. Hydrous titanium oxide gels are possible alternatives to the polyacrylamide gel for rapid separations of oligonucleotides. The present invention is very unique in providing a controllable means of preparing HTiO gels of varied shapes for many possible uses and those needed for analytical electrophoresis systems.

EXAMPLE 13

To place a gel in an electrophoresis capillary tube, one of the chilled broth formulations of the previous examples would be vacuumed or pumped into the capillary tubes which would then be heated to the desired temperature in the range from ambient or room temperatures to 100° C., to cause gelation. Either a convection oven or heating bath can be used. A similar procedure is employed to make films or gel slabs. A chilled broth is vacuumed or pumped into molding cavities of the needed configuration and then heated to the desired temperature to cause gelation. To prevent the gels from sticking, the surfaces of the molding cavities are made of Teflon or pretreated to provide easy removal of the gels. Once removed from the molds, the gels are washed to remove the reaction impurities. Materials of hydrous titanium oxide or hydrous titanium oxide composited with other materials can be made for many other uses.

The broth formulation from the present invention that is preferred for electrophoresis is one that forms a clear amorphous gel at a lower temperature. For this purpose, a formulation with longer gelation time of 60 seconds is acceptable. The following broth formulation can be used at a gelation temperature of 60° C.: [Ti]=0.6M, [H$^+$]=0.82M, [HMTA]=1.2M, and [urea]=1.2M (HMTA/Ti=2.0, urea/Ti=2.0, HMTA/H$^+$=1.46). This broth gels about 39 seconds at 60° C. and forms a fairly clear amorphous gel.

While there has been shown and described what are at present considered the preferred embodiments of the invention, it will be obvious to those skilled in the art that various changes and modifications can be made therein, without departing from the scope of the invention defined by the appended claims.

What is claimed is:

1. A method for preparing hydrous titanium oxide gels comprising the steps of:
    a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion (H$^+$) from about 0.90 to about 3.5, a mole ratio of urea/titanium ≧1 and a molarity of said titanium in said broth in the range of about 0.4 to about 1.0, wherein said hydrogen ion originates from said known amount of said hydrogen ion source;
    b) placing said aqueous broth within a gel-forming operation, said gel-forming operation is at a temperature from about ambient to about 100° C.;
    c) maintaining said temperature of said gel-forming operation from about ambient to about 100° C. to form a gel using an internal gelation process; and
    d) recovering said gel from said gel-forming operation.

2. The method of claim 1 wherein said source of titanium is titanium tetrachloride or titanium (III) chloride.

3. The method of claim 1 wherein said hexamethylenetetramine is in crystalline form.

4. The method of claim 1 wherein said hydrogen ion source comprises hydrochloric acid.

5. The method of claim 1 wherein said chilled broth is stable for ≧1 hour.

6. The method of claim 1 wherein said gel-forming operation comprises a molding vessel having a desired configuration whereby films or gel slabs are formed.

7. The method of claim 1 wherein said gel-forming operation comprises an electrophoresis capillary tube.

8. The method of claim 1 wherein said gels are formed at a temperature from about 55° C. to about 65° C. and said mole ratio of hexamethylenetetramine/titanium is from about 2.25 to about 2.75, said mole ratio of hexamethylenetetramine/H⁺ is from about 1.30 to about 3.3, said gels having a gelation time of ≦30 seconds, thereby producing gels ranging in rigidity from soft to medium gels.

9. The method of claim 1 wherein said gels are formed at a temperature of about 65° C. to about 75° C. and said mole ratio of hexamethylenetetramine/titanium is from about 1.75 to about 2.75, said mole ratio of hexamethylenetetramine/H⁺ is from about 1.00 to about 3.5, said gels having a gelation time of ≦30 seconds, thereby producing gels ranging in rigidity from soft to medium.

10. The method of claim 1 wherein said gels are formed at a temperature of about 75° C. to about 85° C. and said mole ratio of hexamethylenetetramine/titanium is from about 1.5 to about 2.75, said mole ratio of hexamethylenetetramine/H⁺ is from 0.90 to about 3.5, said gels having a gelation time of ≦30 seconds, thereby producing gels ranging in rigidity from soft to hard.

11. The method of claim 1 wherein said gels are formed at a temperature of about 85° C. to about 95° C. and said mole ratio of hexamethylenetetramine/titanium is from about 1.50 to about 2.75, said mole ratio of hexamethylenetetramine/H⁺ is from about 0.90 to about 3.5, said gels having a gelation time of ≦30 seconds, thereby producing gels ranging in rigidity from soft to hard.

12. The method of claim 11 wherein said mole ratio of hexamethylenetetramine/titanium is from about 1.75 to about 2.75 and said mole ratio of hexamethylenetetramine/H⁺ is from about 1.20 to about 2.60, thereby producing gels ranging in rigidity from medium to hard.

13. Hydrous titanium oxide gels produced by the method of claim 1 whereby said gels produced having a rigidity ranging from soft to hard.

14. A method for preparing hydrous titanium oxide spherules comprising the steps of:
   a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion (H⁺) from about 0.90 to about 3.5, a mole ratio of urea/titanium ≧1 and a molarity of said titanium in said broth in the range of about 0.4 to about 1.0, wherein said hydrogen ion originates from said known amount of said hydrogen ion source, said broth being stable for a period of time sufficient enough to prevent gelation prior to step b;
   b) contacting said aqueous broth with an immiscible spherule-forming medium wherein said immiscible spherule-forming medium is at a temperature from about 45° C. to about 100° C.;
   c) maintaining said temperature of said immiscible spherule-forming medium from about 45° C. to about 100° C. to form sol-gel spherules using an internal gelation process; and
   d) recovering said spherules from said spherule-forming medium.

15. The method of claim 14 wherein said source of titanium is titanium tetrachloride or titanium (III) chloride.

16. The method of claim 14 wherein said hexamethylenetetramine is in crystalline form.

17. The method of claim 14 wherein said hydrogen ion source comprises hydrochloric acid.

18. The method of claim 14 wherein said chilled broth is stable for ≧1 hour.

19. The method of claim 14 wherein said spherules are formed at a temperature from about 55° C. to about 65° C. and said mole ratio of hexamethylenetetramine/titanium is from about 2.25 to about 2.75, said mole ratio of hexamethylenetetramine/H⁺ is from about 1.30 to about 3.30, said gels having a gelation time of ≦30 seconds, thereby producing gels ranging in rigidity from soft to medium.

20. The method of claim 14 wherein said spherules are formed at a temperature from about 65° C. to about 75° C. and said mole ratio of hexamethylenetetramine/titanium is from about 1.75 to about 2.75, said mole ratio of hexamethylenetetramine/H⁺ is from about 1.0 to about 3.5, said gels having a gelation time of ≦30 seconds, thereby producing gels ranging in rigidity from soft to medium gels.

21. The method of claim 14 wherein said spherules are formed at a temperature of about 75° C. to about 85° C. and said mole ratio of hexamethylenetetramine/titanium is from about 1.5 to about 2.75, said mole ratio of hexamethylenetetramine/H⁺ is from about 0.9 to about 3.5, said gels having a gelation time of ≦30 seconds, thereby producing gels ranging in rigidity from soft to hard.

22. The method of claim 14 wherein said spherules are formed at a temperature of about 85° C. to about 95° C. and said mole ratio of hexamethylenetetramine/titanium is from 1.50 to about 2.75, said mole ratio of hexamethylenetetramine/H⁺ is from about 0.90 to about 3.5, said gels having a gelation time of ≦30 seconds, thereby producing gels ranging in rigidity from soft to hard.

23. The method of claim 22 wherein said mole ratio of hexamethylenetetramine/titanium is from about 1.75 to about 2.75 and said mole ratio of hexamethylenetetramine/H⁺ is from about 1.20 to about 2.60, thereby producing gels ranging in rigidity from medium to hard.

24. The method of claim 14 wherein said aqueous broth contacts said immiscible gel-forming medium as microdroplets dispersed by a high-intensity pulsed electric field, thereby contacting said micro-droplets of said aqueous broth with said immiscible gel-forming medium, said gel-forming medium being at a temperature from about 45° C. to about 100° C.

25. The method of claim 24 wherein said spherules formed are from about 0.1 to about 0.5 $\mu$m in size.

26. The method of claim 24 wherein said spherules are formed at a temperature of about 75° C. to about 85° C. and said mole ratio of hexamethylenetetramine/titanium is from about 1.5 to about 2.75, said mole ratio of hexamethylenetetramine/H⁺ is from about 0.9 to about 3.5.

27. Hydrous titanium oxide spherules produced by the method of claim 24.

28. Hydrous titanium oxide spherules of claim 27 wherein said spherules formed are about 0.1 to about 0.5 $\mu$m in size.

29. Hydrous titanium oxide spherules produced by the method of claim 14.

30. Hydrous titanium oxide spherules of claim 29 wherein said hexamethylenetetramine is in crystalline form having no additives.

31. Hydrous titanium oxide spherules of claim 29 wherein said spherules are formed at a temperature from about 55° C. to about 65° C. and said mole ratio of hexamethylenetetramine/titanium is from about 2.25 to about 2.75, said mole ratio of hexamethylenetetramine/H⁺ is from about 1.30 to about 3.30, said gels having a gelation time of ≦30 seconds, thereby producing gels ranging in rigidity from soft to medium.

32. Hydrous titanium oxide spherules of claim 29 wherein said spherules are formed at a temperature from about 65° C. to about 75° C. and said mole ratio of hexamethylenetetramine/titanium is from about 1.75 to about 2.75, said mole ratio of hexamethylenetetramine/H⁺ is from about 1.0 to about 3.5, said gels having a gelation time of ≦30 seconds, thereby producing gels ranging in rigidity from soft to medium gels.

33. Hydrous titanium oxide spherules of claim 29 wherein said spherules are formed at a temperature of about 75° C. to about 85° C. and said mole ratio of hexamethylenetetramine/titanium is from about 1.5 to about 2.75, said mole ratio of hexamethylenetetramine/H⁺ is from about 0.9 to about 3.5, said gels having a gelation time of ≦30 seconds, thereby producing gels ranging in rigidity from soft to hard.

34. Hydrous titanium oxide spherules of claim 29 wherein said spherules are formed at a temperature from about 85° C. to about 95° C. and said mole ratio of hexamethylenetetramine/titanium is from about 1.5 to about 2.75, said mole ratio of hexamethylenetetramine/H⁺ is from about 0.9 to about 3.5, said gels having a gelation time of ≦30 seconds, thereby producing gels ranging in rigidity from soft to hard.

35. Hydrous titanium oxide spherules of claim 34 wherein said mole ratio of hexamethylenetetramine/titanium is from about 1.75 to about 2.75 and said mole ratio of hexamethylenetetramine/H⁺ is from about 1.20 to about 2.60, thereby producing gels ranging in rigidity from medium to hard.

36. Hydrous titanium oxide spherules of claim 29 being gelatinous spherules and having specific sizes in a diameter range of 0.1 to 2 mm.

37. A method for converting hydrous titanium oxide spherules to spherules of titanium monohydrogen phosphate having a desired crystallinity, comprising the steps of:
   a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.5 to about 2.75, a mole ratio of hexamethylenetetramine/hydrogen ion (H⁺) from about 0.90 to about 3.5, a mole ratio of urea/titanium ≧1, and a molarity of said titanium in said broth in the range of about 0.4 to about 1.0, wherein said hydrogen ion originates from said known amount of said hydrogen ion source, said broth being stable for a period of time sufficient enough to prevent gelation prior to step b;
   b) contacting said aqueous broth with an immiscible spherule-forming medium, said spherule-forming medium is at a temperature from about 45° C. to about 100° C.;
   c) maintaining said temperature of said immiscible spherule-forming medium from about 45° C. to about 100° C. to form sol-gel spherules using an internal gelation process;
   d) recovering said spherules from said immiscible spherule-forming medium;
   e) rinsing said spherules with an amount of phosphoric acid of ≦0.5M sufficient enough and for a period of time sufficient enough that allows said spherules to be converted to acid insoluble titanium monohydrogen phosphate;
   f) allowing said spherules to be mixed with concentrations of phosphoric acid ≧0.5M;
   g) placing said spherules in a sealed pressure vessel and covering said spherules with a concentration of phosphoric acid sufficient enough as to complete said conversion of said spherules to said acid insoluble titanium monohydrogen phosphate and to prevent said hydrous titanium oxide from dissolving before said conversion;
   h) heating said spherules in said phosphoric acid to a predetermined temperature up to 100° C., said temperature being increased from ambient temperature up to 100° C. over a period of time sufficient enough as to produce said desired crystallinity;
   i) rapidly cooling said spherules;
   j) rinsing said spherules to remove unreacted phosphoric acid; and
   k) air drying said spherules to a constant temperature.

38. The method of claim 37 wherein said titanium source is titanium tetrachloride or titanium (III) chloride.

39. The method of claim 37 wherein said hydrogen ion source comprises hydrochloric acid.

40. The method of claim 37 wherein said spherules in said phosphoric acid in step g are heated to a temperature up to about 70° C. over a period of time of about 1.5 hours to produce amorphous spherules.

41. The method of claim 37 wherein said spherules in said phosphoric acid in step g are heated to a temperature from about 70° C. to about 80° C. over a period of time from about 1.5 to about 2.2 hours to produce semicrystalline spherules.

42. The method of claim 37 wherein said spherules in said phosphoric acid in step g are heated to a temperature from about 80° C. to about 100° C. over a period of time from about 2.2 to 3 hours to produce crystalline spherules.

43. Titanium monohydrogen phosphate spherules having a desired crystallinity produced by the method of claim 37.

44. The titanium monohydrogen phosphate spherules of claim 43 wherein said spherules in said phosphoric acid are heated to a temperature in the range from about 85° C. to about 90° C. over a period of time from about 1.2 hours to about 2.5 hours.

45. The titanium monohydrogen phosphate spherules of claim 43 wherein said spherules in said phosphoric acid are heated to a temperature up to about 70° C. over a period of time of about 1.5 hours to produce amorphous spherules.

46. The titanium monohydrogen phosphate spherules of claim 43 wherein said spherules in said phosphoric acid are heated to a temperature from about 70° C. to about 80° C. over a period of time from about 1.5 to about 2.2 hours to produce semicrystalline spherules.

47. The titanium monohydrogen phosphate spherules of claim 43 wherein said spherules in said phosphoric acid are heated to a temperature from about 80° C. to about 100° C. over a period of time from about 2.2 hours to about 3 hours to produce crystalline spherules.

48. A method for preparing hydrous titanium oxide spherules having suspendible particles homogeneously embedded within, forming a composite sorbent, comprising the steps of:
   a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion (H⁺) from about 0.90 to about 3.5, a mole ratio of urea/titanium ≧1 and a molarity of said titanium in the range from about 0.4 to about 1.0, wherein said hydrogen ion originates from said known amount of said hydrogen ion source;
   b) adding a predetermined amount of said suspendible particles to said broth, said predetermined amount being of a desired weight percent of the total weight of said composite sorbent, said predetermined amount being an amount sufficient enough to optimize the effectiveness of said composite sorbent;

c) continuously mixing said suspendible particles and said aqueous broth while maintaining suspension of said suspendible particles, said broth being stable for a period of time sufficient enough to prevent gelation prior to step d;

d) contacting said broth with an immiscible spherule-forming medium, said spherule-forming medium is at a temperature from about 45° C. to about 100° C.;

e) maintaining said temperature of said immiscible spherule-forming medium from about 45° C. to about 100° C. to form sol-gel spherules using an internal gelation process with gelation times sufficient enough to allow said suspendible particles to remain suspended prior to gelation and up to complete gelation; and f) recovering said spherules from said immiscible spherule-forming medium.

49. The method of claim 48 wherein said source of titanium is titanium tetrachloride or titanium (III) chloride.

50. The method of claim 48 wherein said hydrogen ion source comprises hydrochloric acid.

51. The method of claim 48 wherein said different sorbent is selected from the group consisting of potassium cobalt hexacyanoferrate, sodium cobalt hexacyanoferrate, ammonium molybdophosphate, polyantimonic acid, sodium titanate, sodium silicotitanate, manganese dioxides, and zirconium monohydrogen phosphate.

52. Hydrous titanium oxide spherules having suspendible particles of at least one different sorbent homogeneously embedded within, forming a composite sorbent produced by the method of claim 48.

53. The hydrous titanium oxide spherules of claim 52 wherein said different sorbent is selected from the group consisting of potassium cobalt hexacyanoferrate, sodium cobalt hexacyanoferrate, ammonium molybdophosphate, polyantimonic acid, sodium titanate, sodium silicotitanate, manganese dioxides, and zirconium monohydrogen phosphate.

54. A method for converting hydrous titanium oxide spherules having suspendible particles of at least one different sorbent homogeneously embedded within, forming a composite sorbent, converting to spherules of titanium monohydrogen phosphate having suspendible particles of at least one different sorbent homogeneously embedded within, forming a composite sorbent having a desired crystallinity, said method comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of said titanium in the range from about 0.4 to about 1.0, wherein said hydrogen ion originates from said known amount of said hydrogen ion source;

b) adding a predetermined amount of said suspendible particles to said broth, said predetermined amount being of a desired weight percent of the total weight of said composite sorbent, said predetermined amount being an amount sufficient enough as to optimize the effectiveness of said composite sorbent;

c) continuously mixing said suspendible particles and said broth while maintaining suspension of said suspendible particles, said broth being stable for a period of time sufficient enough to prevent gelation prior to step d;

d) contacting said broth with an immiscible spherule-forming medium, said immiscible spherule-forming medium is at a temperature from about 45° C. to about 100° C.;

e) maintaining said temperature of said immiscible spherule-forming medium form about 45° C. to about 100° C. to form sol-gel spherules using an internal gelation process with gelation times sufficient enough to allow said suspendible particles to remain suspended prior to gelation up to complete gelation;

f) recovering said spherules from said immiscible spherule-forming medium;

g) rinsing said spherules with an amount of phosphoric acid of $\leq 0.5M$ sufficient enough and for a period of time sufficient enough that allows said external surface of said spherules to be converted to acid insoluble titanium monohydrogen phosphate and allowing said spherules to be mixed with concentrations of phosphoric acid $\geq 0.5M$;

h) placing said spherules in a sealed pressure vessel and covering said spherules with a concentration of phosphoric acid sufficient enough to complete said conversion of said spherules to said acid insoluble titanium monohydrogen phosphate and to prevent said hydrous titanium oxide from dissolving before said conversion;

i) heating said spherules in said phosphoric acid to a predetermined temperature up to 100° C., said temperature being increased from ambient temperature up to 100° C. over a period of time sufficient enough to produce said desired crystallinity;

j) rapidly cooling said spherules;

k) rinsing said spherules to remove unreacted phosphoric acid; and l) air drying said spherules to a constant temperature.

55. The method of claim 54 wherein said source of titanium is titanium tetrachloride or titanium (III) chloride.

56. The method of claim 54 wherein said hydrogen ion source comprises hydrochloric acid.

57. The method of claim 54 wherein said spherules in said phosphoric acid are heated to a temperature in the range from about 85° C. to about 90° C. over a period of time from about 1.2 hours to about 2.5 hours.

58. The method of claim 54 wherein said spherules in said phosphoric acid are heated to a temperature up to about 70° C. over a period of time from about 1.5 hours to produce amorphous spherules.

59. The method of claim 54 wherein said spherules in said phosphoric acid are heated to a temperature from about 70° C. to about 80° C. over a period of time from about 1.5 to about 2.2 hours to produce semicrystalline spherules.

60. The method of claim 54 wherein said spherules in said phosphoric acid are heated to a temperature from about 80° C. to about 100° C. over a period of time from about 2.2 to 3 hours to produce crystalline spherules.

61. The method of claim 54 wherein said different sorbent is selected from the group consisting of potassium cobalt hexacyanoferrate, sodium cobalt hexacyanoferrate, ammonium molybdophosphate, polyantimonic acid, sodium titanate, sodium silicotitanate, manganese dioxides, and zirconium monohydrogen phosphate.

62. Spherules of titanium monohydrogen phosphate having suspendible particles of at least one different sorbent homogeneously embedded within, forming a composite sorbent having a desired crystallinity produced by the method of claim 54.

63. The spherules of claim 62 wherein said different sorbent is selected from the group consisting of potassium cobalt hexacyanoferrate, sodium cobalt hexacyanoferrate, ammonium molybdophosphate, polyantimonic acid, sodium titanate, sodium silicotitanate, manganese dioxides and zirconium monohydrogen phosphate.

64. The spherules of claim 62 wherein said spherules and said phosphoric acid is heated to a temperature in the range from about 85° C. to about 90° C. over a period of time from about 1.2 hours to about 2.5 hours.

65. The spherules of claim 62 wherein said spherules in said phosphoric acid are heated to a temperature up to about 70° C. over a period of time from about 1.5 hours to produce amorphous spherules.

66. The spherules of claim 62 wherein said spherules in said phosphoric acid are heated to a temperature from about 70° C. to about 80° C. over a period of time from about 1.5 to about 2.2 hours to produce semicrystalline spherules.

67. The spherules of claim 62 wherein said spherules in said phosphoric acid are heated to a temperature from about 80° C. to about 100° C. over a period of time from about 2.2 to 3 hours to produce crystalline spherules.

68. A method for preparing titanium oxide spherules comprising the steps of:
   a) providing a homogeneous aqueous broth comprising hexamethylenetetramine, urea, a source of titanium, a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of said titanium in the range from about 0.4 to about 1.0, wherein said hydrogen ion originates from said known amount of said hydrogen ion source, said broth being stable for a period of time sufficient enough to prevent gelation prior to step b;
   b) contacting said broth with an immiscible spherule-forming medium, said immiscible spherule-forming medium is at a temperature from about 45° C. to about 100° C.;
   c) maintaining said temperature of said immiscible spherule-forming medium from about 45° C. to about 100° C. to form sol-gel spherules using an internal gelation process;
   d) recovering said spherules from said immiscible spherule-forming medium;
   e) rinsing said spherules to remove remaining reaction impurities;
   f) placing said spherules in a heating unit, said spherules forming a bed of spherules within said heating unit, said heating unit providing means to allow moist heated air or oxygen to uniformly flow through said bed of spherules while heating, said moist heated air or oxygen being at a temperature less than said spherules within said heating unit thereby preventing condensation within said heating unit;
   g) heating said spherules within said heating unit to a temperature sufficient enough and over a period of time sufficient enough to vaporize the free water within said spheres;
   h) further heating said spherules to a temperature sufficient enough and for a time period sufficient enough to form an oxide of titanium; and
   i) cooling said spherules.

69. The method of claim 68 wherein said titanium source is titanium tetrachloride or titanium (III) chloride.

70. The method of claim 68 wherein said hydrogen ion source comprises hydrochloric acid.

71. The method of claim 68 wherein said spherules are heated in step g to a temperature up to 860° C. to form anatase.

72. The method of claim 68 wherein said spherules are heated in step g to a temperature in the range from about 860° C. up to about 1040° C. to form brookite.

73. The method of claim 68 wherein said spherules are heated in step g to a temperature $\geq 1040°$ C. to form rutile.

74. Titanium oxide spherules produced by the method of claim 68.

75. The titanium oxide spherules of claim 74 wherein said spherules are heated in step g to a temperature up to about 860° C. to form anatase spherules.

76. The titanium oxide spherules of claim 74 wherein said spherules are heated in step g to a temperature in the range from about 860° C. up to about 1040° C. to form brookite spherules.

77. The titanium oxide spherules of claim 74 wherein said spherules are heated in step g to a temperature $\geq 1040°$ C. to form rutile spherules.

78. A method for preparing titanium oxide spherules having suspendible particles homogeneously embedded within, forming a composite, comprising the steps of:
   a) providing a homogeneous aqueous broth comprising hexamethylenetetramine, urea, a source of titanium, a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of said titanium in the range from about 0.4 to about 1.0, wherein said hydrogen ion originates from said known amount of said hydrogen ion source;
   b) adding a predetermined amount of said suspendible particles to said broth, said predetermined amount being of a desired weight percent of the total weight of said composite, said predetermined amount being an amount sufficient enough to optimize the effectiveness of said composite;
   c) continuously mixing said suspendible particles and said broth while maintaining suspension of said suspendible particles, said broth being stable for a period of time sufficient enough to prevent gelation prior to step d;
   d) contacting said broth with an immiscible spherule-forming medium, said immiscible spherule-forming medium is at a temperature from about 45° C. to about 100° C.;
   e) maintaining said temperature of said immiscible spherule-forming medium from about 45° C. to about 100° C. to form sol-gel spherules using an internal gelation process with gelation times sufficient enough to maintain the suspension of said suspendible particles prior to gelation and up to complete gelation;
   f) recovering said spherules from said immiscible spherule-forming medium;
   g) rinsing said spherules to remove remaining reaction impurities;
   h) placing said spherules in a heating unit, said spherules forming a bed of spherules within said heating unit, said heating unit providing means to allow moist heated air or oxygen to uniformly flow through said bed of spherules while heating, said moist heated air or oxygen being at a temperature less than said spherules within said heating unit thereby preventing condensation within said heating unit;

i) heating said spherules within said heating unit to a temperature sufficient enough and over a period of time sufficient enough to vaporize the free water within said spherules;

j) further heating said spherules to a temperature sufficient enough and for a time period sufficient enough to form an oxide of titanium;

k) drying said spherules for a period of time sufficient enough to allow for evaporation of remaining moisture; and l) dissolving said particles within said spherules with a sufficient amount of a solution selected from the group consisting of ammonium hydroxide, air and oxygen at a sufficient concentration as to facilitate said dissolution.

79. The method of claim 78 wherein said titanium source is titanium tetrachloride or titanium (III) chloride.

80. The method of claim 78 wherein said hydrogen ion source comprises hydrochloric acid.

81. The method of claim 78 wherein said spherules are heated in step i to a temperature up to about 860° C. to form anatase.

82. The method of claim 78 wherein said spherules are heated in step i to a temperature in the range from about 860° C. up to about 1040° C. to form brookite.

83. The method of claim 78 wherein said spherules are heated in step i to a temperature ≧1040° C. to form rutile.

84. The method of claim 78 wherein said suspendible particles are selected from the group consisting of nickel, zinc and organic anion resin.

85. Titanium oxide spherules having suspendible particles homogeneously embedded within, forming a composite, produced by the method of claim 78.

86. The titanium oxide spherules of claim 85 wherein said spherules are heated in step i to a temperature up to about 860° C. to form anatase.

87. The titanium oxide spherules of claim 85 wherein said spherules are heated in step i to a temperature in the range from about 860° C. up to about 1040° C. to form brookite.

88. The titanium oxide spherules of claim 85 wherein said spherules are heated in step i to a temperature ≧1040° C. to form rutile.

89. The titanium oxide spherules of claim 85 wherein said suspendible particles are selected from the group consisting of nickel, zinc and organic anion resin.

90. A method for producing hydrous titanium oxide fiber materials comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium ≧1 and a molarity of said titanium in said broth in the range of about 0.4 to about 1.0, wherein said hydrogen ion originates from said known amount of said hydrogen ion source, said broth being stable for a period of time sufficient enough to prevent gelation prior to step b;

b) contacting said broth with an immiscible spherule-forming medium, wherein said immiscible spherule-forming medium is at a temperature from about 45° C. to about 100° C.;

c) maintaining said temperature of said immiscible spherule-forming medium from about 45° C. to about 100° C. to form sol-gel spherules using an internal gelation process, said gels having a rigidity ranging from soft to hard;

d) recovering said spherules from said immiscible spherule-forming medium;

e) introducing said spherules into a single screw extruder;

f) extruding said spherules through a die containing multiple micro orifices, thereby producing extruded gelatinous strands; and g) recovering said gelatinous strands.

91. The method of claim 90 wherein said titanium source is titanium tetrachloride or titanium (III) chloride.

92. The method of claim 90 wherein said hydrogen ion source comprises hydrochloric acid.

93. The method of claim 90 wherein said micro orifices have inner diameters in the range of 50 to 200 $\mu$m.

94. The method of claim 90 wherein said spherules are formed at a temperature from about 55° C. to about 65° C. and said mole ratio of hexamethylenetetramine/titanium is from about 2.25 to about 2.75, said mole ratio of hexamethylenetetramine/$H^+$ is from about 1.3 to about 3.3, said gels having a gelation time of ≦30 seconds, thereby producing soft to medium gels.

95. The method of claim 90 wherein said spherules are formed at a temperature from about 65° C. to about 75° C. and said mole ratio of hexamethylenetetramine/titanium is from about 1.75 to about 2.75, said mole ratio of hexamethylenetetramine/$H^+$ is from about 1.0 to about 3.5, said gels having a gelation time of ≦30 seconds, thereby producing gels ranging in rigidity from soft to medium gels.

96. The method of claim 90 wherein said spherules are formed at a temperature of about 75° C. to about 85° C. and said mole ratio of hexamethylenetetramine/titanium is from about 1.5 to about 2.75, said mole ratio of hexamethylenetetramine/$H^+$ is from about 0.9 to about 3.5, said gels having a gelation time of ≦30 seconds, thereby producing gels ranging in rigidity from soft to hard.

97. The method of claim 90 wherein said spherules are formed at a temperature of about 85° C. to about 95° C. and said mole ratio of hexamethylenetetramine/titanium is from 1.5 to about 2.75, said mole ratio of hexamethylenetetramine/$H^+$ is from about 0.9 to about 3.5, said gels having a gelation time of ≦30 seconds, thereby producing gels ranging in rigidity from soft to hard.

98. The method of claim 97 wherein said mole ratio of hexamethylenetetramine/titanium is from about 1.75 to about 2.75 and said mole ratio of hexamethylenetetramine/$H^+$ is from about 1.2 to about 2.6, thereby producing gels ranging in rigidity from medium to hard.

99. Hydrous titanium oxide fiber materials produced by the method of claim 90.

100. A method for producing titanium oxide fiber materials comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium ≧1 and a molarity of said titanium in said broth in the range of about 0.4 to about 1.0, wherein said hydrogen ion originates from said known amount of said hydrogen ion source, said broth being stable for a period of time sufficient enough to prevent gelation prior to step b;

b) contacting said broth with an immiscible spherule-forming medium, wherein said immiscible spherule-forming medium is at a temperature from about 45° C. to about 100° C.;

c) maintaining said temperature of said immiscible spherule-forming medium from about 45° C. to about 100° C. to form sol-gel spherules using an internal gelation process;

d) recovering said spherules from said immiscible spherule-forming medium;

e) introducing said spherules into a single screw extruder;

f) extruding said spherules through a die containing multiple micro orifices, thereby producing extruded gelatinous strands;

g) recovering said gelatinous strands;

h) placing said recovered gelatinous strands in a heating unit, said strands forming a bed of strands within said heating unit, said heating unit providing means to allow moist heated air or oxygen to uniformly flow through said bed of strands while heating, said moist heated air or oxygen being at a temperature less than said strands within said heating unit thereby preventing condensation within said heating unit;

i) heating said strands within said heating unit to a temperature sufficient enough and over a period of time sufficient enough to vaporize the free water within said strands;

j) further heating said strands to a temperature sufficient enough and for a time period sufficient enough to form an oxide of titanium; and k) cooling said strands.

101. The method of claim 100 wherein said titanium source is titanium tetrachloride or titanium (III) chloride.

102. The method of claim 100 wherein said hydrogen ion source comprises hydrochloric acid.

103. The method of claim 100 wherein said strands are heated in step j to a temperature up to about 860° C. to form anatase.

104. The method of claim 100 wherein said strands are heated in step j to a temperature in the range from about 860° C. up to about 1040° C. to form brookite.

105. The method of claim 100 wherein said strands are heated in step j to a temperature $\geq 1040°$ C. to form rutile.

106. Titanium oxide fiber materials produced by the method of claim 100.

107. Titanium oxide fiber materials produced by the method of claim 100 wherein said strands are heated in step j to a temperature up to about 860° C. to form anatase.

108. Titanium oxide fiber materials produced by the method of claim 100 wherein said strands are heated in step j to a temperature in the range from about 860° C. up to about 1040° C. to form brookite.

109. Titanium oxide fiber materials produced by the method of claim 99 wherein said strands are heated in step j to a temperature $\geq 1040°$ C. to form rutile.

110. A method for preparing hydrous titanium oxide fiber materials having suspendible particles homogeneously embedded within, forming a composite, comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of said titanium in the range from about 0.4 to about 1.0, wherein said hydrogen ion originates from said known amount of said hydrogen ion source;

b) adding a predetermined amount of said suspendible particles to said broth, said predetermined amount being of a desired weight percent of the total weight of said composite, said predetermined amount being an amount sufficient enough to optimize the effectiveness of said composite;

c) continuously mixing said suspendible particles and said broth while maintaining suspension of said suspendible particles, said broth being stable for a period of time sufficient enough to prevent gelation prior to step d;

d) contacting said broth with an immiscible spherule-forming medium, said immiscible spherule-forming medium is at a temperature from about 45° C. to about 100° C.;

e) maintaining said temperature of said immiscible spherule-forming medium from about 45° C. to about 100° C. to form sol-gel spherules using an internal gelation process with gelation times sufficient enough to allow said suspendible particles to remain suspended prior to gelation and up to complete gelation;

f) recovering said spherules from said immiscible spherule-forming medium;

g) introducing said spherules into a single screw extruder;

h) extruding said spherules through a die containing multiple micro orifices, thereby producing extruded gelatinous strands; and i) recovering said gelatinous strands.

111. The method of claim 110 wherein said source of titanium is titanium tetrachloride or titanium (III) chloride.

112. The method of claim 110 wherein said hydrogen ion source comprises hydrochloric acid.

113. The method of claim 110 wherein said suspendible particles are selected from the group consisting of nickel, platinum and iron oxide.

114. Hydrous titanium oxide fiber materials having suspendible particles homogeneously embedded within, forming a composite, produced by the method of claim 110.

115. Hydrous titanium oxide fiber materials of claim 114 wherein said suspendible particles are selected from the group consisting of nickel, platinum and iron oxide.

116. A method for preparing titanium oxide fiber materials having suspendible particles homogeneously embedded within, forming a composite, comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of said titanium in the range from about 0.4 to about 1.0, wherein said hydrogen ion originates from said known amount of said hydrogen ion source;

b) adding a predetermined amount of said suspendible particles to said broth, said predetermined amount being of a desired weight percent of the total weight of said composite, said predetermined amount being an amount sufficient enough to optimize the effectiveness of said composite;

c) continuously mixing said suspendible particles and said broth while maintaining suspension of said suspendible particles, said broth being stable for a period of time sufficient enough to prevent gelation prior to step d;

d) contacting said broth with an immiscible spherule-forming medium, said immiscible spherule-forming medium is at a temperature from about 45° C. to about 100° C.;

e) maintaining said temperature of said immiscible spherule-forming medium from about 45° C. to about 100° C. to form sol-gel spherules using an internal gelation process with gelation times sufficient enough to allow said suspendible particles to remain suspended prior to gelation and up to complete gelation;

f) recovering said spherules from said immiscible spherule-forming medium;

g) introducing said spherules into a single screw extruder;

h) extruding said spherules through a die containing multiple micro orifices, thereby producing extruded gelatinous strands;

i) recovering said gelatinous strands;

j) placing said recovered gelatinous strands in a heating unit, said strands forming a bed of strands within said heating unit, said heating unit providing means to allow moist heated air or oxygen to uniformly flow through said bed of strands while heating, said moist heated air or oxygen being at a temperature less than said strands within said heating unit thereby preventing condensation within said heating unit;

k) heating said strands within said heating unit to a temperature sufficient enough and over a period of time sufficient enough to vaporize the free water within said strands;

l) further heating said strands to a temperature sufficient enough and for a time period sufficient enough to form an oxide of titanium; and m) cooling said strands.

117. The method of claim 116 wherein said source of titanium is titanium tetrachloride or titanium (III) chloride.

118. The method of claim 116 wherein said hydrogen ion source comprises hydrochloric acid.

119. The method of claim 116 wherein said suspendible particles are selected from the group consisting of nickel, platinum and iron oxide.

120. The method of claim 116 wherein said strands are heated in step j to a temperature up to about 860° C. to form anatase.

121. The method of claim 116 wherein said strands are heated in step j to a temperature in the range from about 860° C. up to about 1040° C. to form brookite.

122. The method of claim 116 wherein said strands are heated in step j to a temperature $\geq 1040°$ C. to form rutile.

123. The method of claim 116 wherein said predetermined amount of said suspendible particles is of a desired weight percent of $\leq 20\%$ of the total weight of said composite.

124. Titanium oxide fiber materials having suspendible particles homogeneously embedded within, forming a composite, produced the method of claim 116.

125. Titanium oxide fiber materials produced by the method of claim 116 wherein said suspendible particles are selected from the group consisting of nickel, platinum and iron oxide.

126. Titanium oxide fiber materials produced by the method of claim 116 wherein said strands are heated in step j to a temperature up to about 860° C. to form anatase.

127. Titanium oxide fiber materials produced by the method of claim 116 wherein said strands are heated in step j to a temperature in the range from about 860° C. up to about 1040° C. to form brookite.

128. Titanium oxide fiber materials produced by the method of claim 116 wherein said strands are heated in step j to a temperature $\geq 1040°$ C. to form rutile.

129. Titanium oxide fiber materials produced by the method of claim 116 wherein said predetermined amount of said suspendible particles is of a desired weight percent of $\leq 20\%$ of the total weight of said composite.

130. A method for preparing spherules of barium titanate comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion ($H^+$) from about 0.90 to about 3.5, a mole ratio of urea/titanium $\geq 1$ and a molarity of said titanium in said broth in the range of about 0.4 to about 1.0, wherein said hydrogen ion originates from said known amount of said hydrogen ion source, said broth being stable for a period of time sufficient enough to prevent gelation prior to step b;

b) contacting said aqueous broth as micro-droplets dispersed within an immiscible spherule-forming medium wherein said immiscible spherule-forming medium is at a temperature from about 45° C. to about 100° C.;

c) maintaining said temperature of said immiscible spherule-forming medium from about 45° C. to about 100° C. to form sol-gel spherules using an internal gelation process;

d) recovering said spherules from said spherule-forming medium;

e) rinsing said spherules to remove reaction impurities from said spherules;

f) soaking said spherules in a sufficient amount of ethanol to displace the free water in the spherules with ethanol;

g) placing said spherules in a heating vessel having means to prevent loss of reaction solutions, said heating vessel containing a solution of barium ethoxide wherein said solution having a barium/titanium mole ratio $\geq 2$;

h) heating said solution while mixing with nitrogen gas to a temperature sufficient enough and for a time sufficient enough to convert said spherules to a titanium(IV) ethoxide form;

i) replacing a sufficient amount of said reaction solution within said heating vessel with a sufficient amount of water to hydrolyze said spherules to barium titanate;

j) heating said water and said reaction solution while mixing with nitrogen gas for a sufficient time period and heating at a sufficient temperature for hydrolysis to occur;

k) recovering said spherules from said heating vessel;

l) rinsing said spherules to remove reaction impurities; and m) drying said spherules.

131. The method of claim 130 wherein said source of titanium is titanium tetrachloride or titanium (III) chloride.

132. The method of claim 130 wherein said hexamethylenetetramine is in crystalline form.

133. The method of claim 130 wherein said hydrogen ion source comprises hydrochloric acid.

134. The method of claim 130 wherein said chilled broth is stable for ≧1 hour.

135. The method of claim 130 wherein said spherules formed are from about 0.1 to about 0.5 µm in size.

136. The method of claim 130 wherein said spherules are formed at a temperature of about 75° C. to about 85° C. and said mole ratio of hexamethylenetetramine/titanium is from about 1.5 to about 2.75, said mole ratio of hexamethylenetetramine/H$^+$ is from about 0.9 to about 3.5.

137. A method for preparing spherules of barium titanate comprising the steps of:

a) providing a homogeneous aqueous broth comprising hexamethylenetetramine, urea, a source of titanium and a known amount of a hydrogen ion source at a temperature from about 0° C. to about 10° C., wherein said broth having a mole ratio of hexamethylenetetramine/titanium from about 1.50 to about 2.75, a mole ratio of hexamethylenetetramine/hydrogen ion (H$^+$) from about 0.90 to about 3.5, a mole ratio of urea/titanium ≧1 and a molarity of said titanium in said broth in the range of about 0.4 to about 1.0, wherein said hydrogen ion is said known amount of said hydrogen ion source, said broth being stable for a period of time sufficient enough to prevent gelation prior to step b;

b) contacting said aqueous broth as micro-droplets dispersed within an immiscible spherule-forming medium wherein said immiscible spherule-forming medium is at a temperature from about 45° C. to about 100° C.;

c) maintaining said temperature of said immiscible spherule-forming medium from about 45° C. to about 100° C. to form hydrous titanium oxide sol-gel spherules using an internal gelation process;

d) recovering said spherules from said spherule-forming medium;

e) rinsing said spherules to remove reaction impurities from said spherules;

f) placing said spherules in a reaction vessel containing a sufficient amount of barium hydroxide solution to convert said hydrous titanium oxide spherules to barium titanate spherules, said barium hydroxide solution having a sufficient barium concentration so as a mole ratio of barium/titanium in said spherules is ≧1;

g) heating said solution and spherules to a temperature sufficient enough and for a time sufficient enough to convert said hydrous titanium oxide spherules to barium titanate spherules;

h) recovering said spherules from said heating vessel;

i) rinsing said spherules to remove reaction impurities; and m) drying said spherules.

138. The method of claim 137 wherein said source of titanium is titanium tetrachloride or titanium (III) chloride.

139. The method of claim 137 wherein said hexamethylenetetramine is in crystalline form.

140. The method of claim 137 wherein said hydrogen ion source comprises hydrochloric acid.

141. The method of claim 137 wherein said chilled broth is stable for ≧1 hour.

142. The method of claim 137 wherein said spherules formed are from about 0.1 to about 0.5 µm in size.

143. The method of claim 137 wherein said spherules are formed at a temperature of about 75° C. to about 85° C. and said mole ratio of hexamethylenetetramine/titanium is from about 1.5 to about 2.75, said mole ratio of hexamethylenetetramine/H$^+$ is from about 0.9 to about 3.5.

* * * * *